(12) United States Patent
Yamazaki

(10) Patent No.: US 11,769,902 B2
(45) Date of Patent: Sep. 26, 2023

(54) NONAQUEOUS SECONDARY BATTERY

(71) Applicant: SEMICONDUCTOR ENERGY LABORATORY CO., LTD., Atsugi (JP)

(72) Inventor: Shunpei Yamazaki, Tokyo (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 103 days.

(21) Appl. No.: 16/914,772

(22) Filed: Jun. 29, 2020

(65) Prior Publication Data

US 2020/0335761 A1    Oct. 22, 2020

Related U.S. Application Data

(63) Continuation of application No. 14/537,989, filed on Nov. 11, 2014, now Pat. No. 10,727,465.

(30) Foreign Application Priority Data

Nov. 15, 2013 (JP) .................................. 2013-236697

(51) Int. Cl.
| | |
|---|---|
| *H01M 10/0525* | (2010.01) |
| *H01M 50/449* | (2021.01) |
| *H01M 50/457* | (2021.01) |
| *H01M 50/126* | (2021.01) |
| *H01M 50/119* | (2021.01) |

(52) U.S. Cl.
CPC ..... *H01M 10/0525* (2013.01); *H01M 50/449* (2021.01); *H01M 50/457* (2021.01); *H01M 50/119* (2021.01); *H01M 50/126* (2021.01); *Y02T 10/70* (2013.01)

(58) Field of Classification Search
None
See application file for complete search history.

(56) References Cited

U.S. PATENT DOCUMENTS

| | | | |
|---|---|---|---|
| 4,215,186 | A | 7/1980 | Jaeger |
| 7,138,207 | B2 | 11/2006 | Yamaguchi et al. |
| 7,662,517 | B2 | 2/2010 | Lee et al. |
| 7,867,649 | B2 | 1/2011 | Yamaguchi et al. |

(Continued)

FOREIGN PATENT DOCUMENTS

| | | |
|---|---|---|
| CN | 104137321 A | 11/2014 |
| EP | 0854529 A | 7/1998 |

(Continued)

*Primary Examiner* — Lisa S Park
(74) *Attorney, Agent, or Firm* — NIXON PEABODY LLP; Jeffrey L. Costellia

(57) ABSTRACT

To provide a novel structure of a separator in a secondary battery. A nonaqueous secondary battery includes a positive electrode, a negative electrode, an electrolyte solution, a first separator, and a second separator. The first separator and the second separator are provided between the positive electrode and the negative electrode. The first separator is provided with a first pore, the second separator is provided with a second pore, and the size of the first pore is different from the size of the second pore. Furthermore, the proportion of the volume of the first pores in the first separator is different from the proportion of the volume of the second pores in the second separator.

26 Claims, 17 Drawing Sheets

(56) References Cited

U.S. PATENT DOCUMENTS

| | | |
|---|---|---|
| 8,017,263 B2 | 9/2011 | Ogawa et al. |
| 8,597,830 B2 | 12/2013 | Kawakami et al. |
| 8,715,610 B2 | 5/2014 | Wallace et al. |
| 8,802,268 B2 | 8/2014 | Hagiwara et al. |
| 8,846,237 B2 | 9/2014 | Kim et al. |
| 8,900,742 B2 | 12/2014 | Ahn et al. |
| 8,986,871 B2 | 3/2015 | Kim et al. |
| 9,601,739 B2 | 3/2017 | Sugawara et al. |
| 9,911,955 B2 | 3/2018 | Sugawara et al. |
| 10,230,089 B2 | 3/2019 | Sawai et al. |
| 2001/0033962 A1 | 10/2001 | Suzuki |
| 2003/0118896 A1 | 6/2003 | Yamaguchi |
| 2006/0222936 A1 | 10/2006 | Yamaguchi et al. |
| 2008/0187825 A1 | 8/2008 | Kawabata et al. |
| 2008/0241660 A1* | 10/2008 | Ogawa ............... H01M 50/449 429/122 |
| 2009/0136834 A1* | 5/2009 | Coowar ............... H01M 50/136 29/623.2 |
| 2010/0081057 A1 | 4/2010 | Liu et al. |
| 2010/0261047 A1* | 10/2010 | Kim ............... H01M 50/491 429/144 |
| 2010/0301279 A1 | 12/2010 | Nesper et al. |
| 2011/0104541 A1 | 5/2011 | Ahn et al. |
| 2011/0121240 A1 | 5/2011 | Amine et al. |
| 2011/0227000 A1 | 9/2011 | Ruoff et al. |
| 2011/0287341 A1 | 11/2011 | Inoue et al. |
| 2011/0294009 A1 | 12/2011 | Kawakami et al. |
| 2011/0300437 A1 | 12/2011 | Yi |
| 2012/0002349 A1 | 1/2012 | Ito et al. |
| 2012/0202101 A1 | 8/2012 | Ueda |
| 2012/0321932 A1 | 12/2012 | Ise et al. |
| 2013/0134051 A1 | 5/2013 | Takahashi et al. |
| 2013/0224562 A1 | 8/2013 | Momo |
| 2014/0079980 A1* | 3/2014 | Halmo ............... H01M 50/411 264/138 |
| 2014/0186686 A1 | 7/2014 | Takahashi et al. |
| 2014/0272555 A1* | 9/2014 | Roelofs ............... H01M 10/0525 429/223 |
| 2015/0010798 A1 | 1/2015 | Sawai et al. |
| 2015/0111088 A1 | 4/2015 | Hiroki et al. |
| 2015/0140396 A1 | 5/2015 | Yamazaki |
| 2015/0140400 A1 | 5/2015 | Yamazaki et al. |
| 2015/0155530 A1 | 6/2015 | Takahashi et al. |
| 2016/0028065 A1* | 1/2016 | Park ............... H01M 10/0459 429/144 |

FOREIGN PATENT DOCUMENTS

| | | |
|---|---|---|
| EP | 1251573 A | 10/2002 |
| EP | 2056376 A | 5/2009 |
| EP | 2822086 A | 1/2015 |
| JP | 09-213377 A | 8/1997 |
| JP | 10-172565 A | 6/1998 |
| JP | 2002-319386 A | 10/2002 |
| JP | 2007-227364 A | 9/2007 |
| JP | 2007-280724 A | 10/2007 |
| JP | 2008-524824 | 7/2008 |
| JP | 2012-151036 A | 8/2012 |
| JP | 2013-099940 A | 5/2013 |
| JP | 2013-178934 A | 9/2013 |
| KR | 2014-0144193 A | 12/2014 |
| WO | WO-2009/131180 | 10/2009 |
| WO | WO-2010/125867 | 11/2010 |
| WO | WO-2012/165358 | 12/2012 |
| WO | WO-2013/054936 | 4/2013 |
| WO | WO-2013/118627 | 8/2013 |
| WO | WO-2013/128652 | 9/2013 |
| WO | WO-2014/175011 | 10/2014 |

* cited by examiner

FIG. 9A1
FIG. 9A2
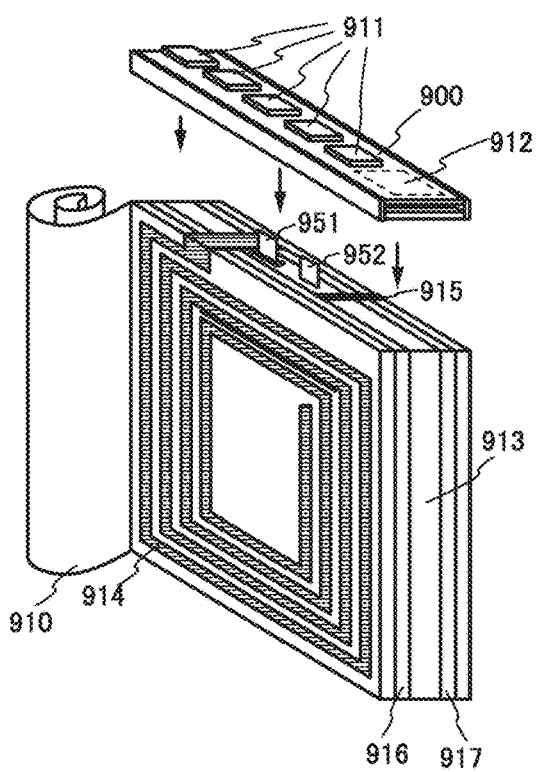
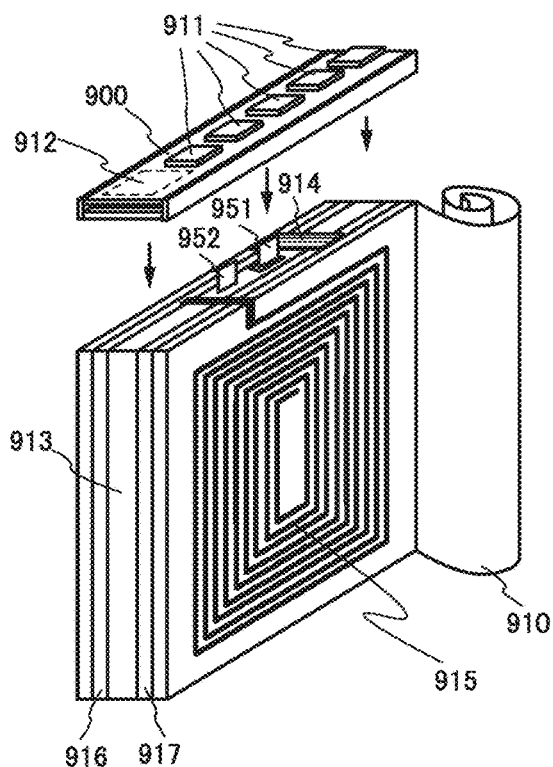
FIG. 9B1
FIG. 9B2
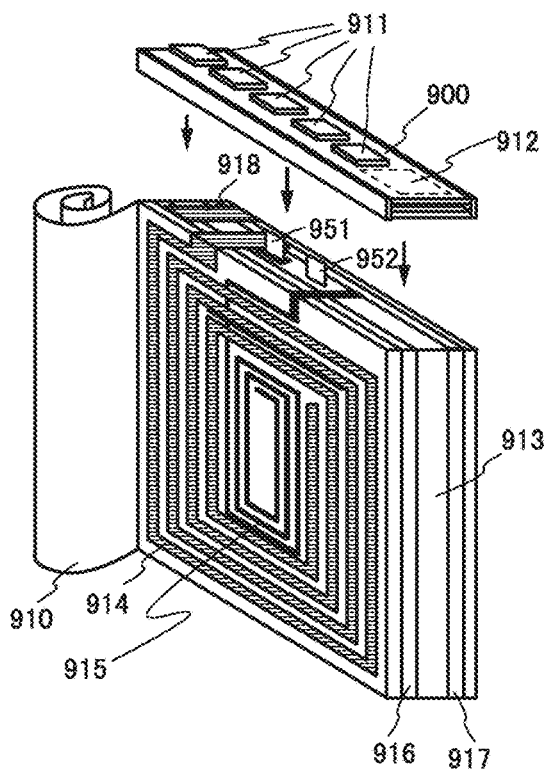
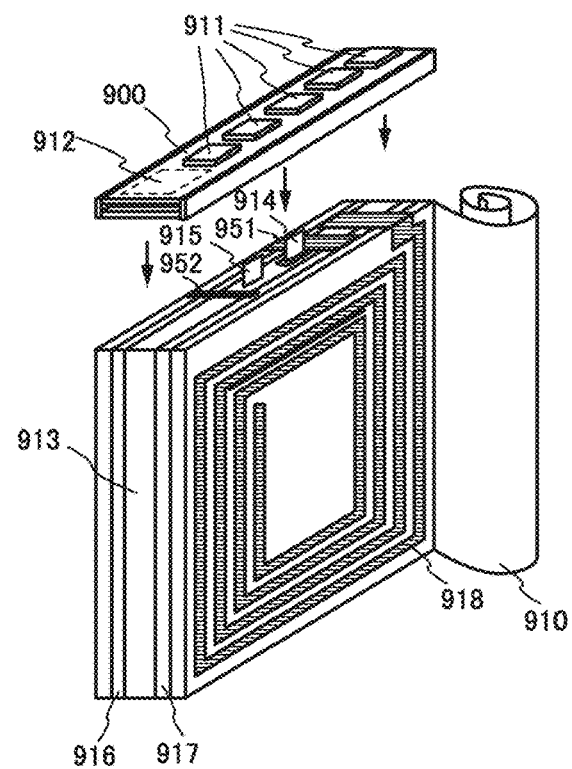

NONAQUEOUS SECONDARY BATTERY

BACKGROUND OF THE INVENTION

1. Field of the Invention

One embodiment of the proem invention relates to a nonaqueous secondary battery and a method for manufacturing the nonaqueous secondary battery.

Note that one embodiment of the present invention is not limited to the above technical field. The technical field of one embodiment of the invention disclosed in this specification and the like relates to an object, a method, or a manufacturing method. In addition, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a storage device, a method for driving any of them, and a method for manufacturing any of them.

2. Description of the Related Art

In recent years, a variety of power storage devices, for example, secondary batteries such as lithium-ion secondary batteries, lithium-ion capacitors, air batteries, and fuel batteries have been actively developed (Patent Documents 1 to 3). In particular, demand for lithium-ion secondary batteries with high output and high energy density has rapidly grown with the development of the semiconductor industry and with the growth of demand for energy saving, for electrical devices, for example, portable information terminals such as cellular phones, smartphones, and laptop personal computers, portable music players, and digital cameras; medical equipment; next-generation clean energy vehicles such as hybrid electric vehicles (HEVs), electric vehicles (EVs), and plug-in hybrid electric vehicles (PHEVs); stationary power storage devices; and the like, the lithium-ion secondary batteries are essential for today's information society.

A lithium-ion secondary battery, which is one of nonaqueous secondary batteries, includes a positive electrode, a negative electrode, a separator, a nonaqueous electrolyte solution, and an exterior body covering these components. In lithium-ion secondary batteries, positive electrodes and negative electrodes are generally used; the positive electrodes each include a positive electrode current collector made of aluminum or the like and a positive electrode mix which includes a positive electrode active material capable of occluding and releasing lithium ions and which is applied to both surfaces of the positive electrode current collector, and the negative electrodes each include a negative electrode current collector made of copper or the like and a negative electrode mix which includes a negative electrode active material capable of occluding and releasing lithium ions and which is applied to both surfaces of the negative electrode current collector. These positive and negative electrodes are insulated from each other by a separator provided therebetween, and the positive electrode and the negative electrode are electrically connected to a positive electrode terminal and a negative electrode terminal, respectively, which are provided on the exterior body. The exterior body has a certain shape such as a cylindrical shape or a rectangular shape.

REFERENCES

Patent Documents

[Patent Document 1] PCT International Publication No. WO2012/16538
[Patent Document 2] United States Patent Application Publication No. 2012/ 0002349
[Patent Document 3] PCT International Publication No. WO2009/131180

SUMMARY OF THE INVENTION

The separator is provided between the positive electrode and the negative electrode and has a function of preventing direct contact between the electrodes. If the electrodes directly contact each other in the lithium-ion secondary battery, an uncontrollable high current flows between the electrodes, and, for example, a large amount of heat is generated, causing a safety hazard in some cases. Even when a safety hazard is not caused, self-discharge occurs and a function as the battery is impaired.

Furthermore, in a process of manufacturing or charging/discharging the lithium-ion secondary battery, a part of carrier ions contributing to charging/discharging is deposited on a surface of the negative electrode and becomes an irreversible component, which impairs a function as the battery. When the deposition of lithium further proceeds, it becomes a whisker-like structure (whisker) and grows in some cases. The structure might pass through a pore in the separator and connect the electrodes depending on the property of the separator, which also causes a problem.

Furthermore, in order for the battery to function, the separator needs to have a function of holding the electrolyte solution. In addition, ionic conductivity is required for the separator Note that the ionic conductivity and the function of holding the electrolyte solution are significantly related to the property of the pore in a layer of the separator.

The separator is generally formed using a porous material. The size and the shape of a pore formed in the separator and the proportion of the volume of pores in the layer of the separator (i.e., porosity) depend on a material of the separator. As the size of the pore in the separator is larger or the proportion of the volume of the pores (porosity) is higher, ionic conductivity becomes higher whereas a function of insulating the electrodes is more impaired. In the case where a whisker-like structure (whisker) is generated, the whisker-like structure penetrates through the separator more easily, which lowers insulation performance. On the other hand, the pore in the separator is less likely to be blocked by a separated lump of the above-described irreversible component formed through the deposition of lithium or other components or by u particle of an active material separated from an active material layer; accordingly, ionic conductivity is kept more easily.

The sizes and the amount of pores formed in the separator are determined by a material and a formation method of the separator In order to obtain a separator having predetermined ionic conductivity and mechanical strength, the selection of the material and the formation method needs to be examined minutely. However, there is a limitation on the selection of the material and the formation method of the separator; it is not easy to form a separator having a desired property.

Furthermore, in a lithium-ion secondary battery having flexibility, various kinds of stress are generated inside the secondary battery in accordance with change in the shape of the secondary battery. In the case where the secondary battery docs not have a structure for relieving the stress, shear failure occurs easily at a portion of the secondary battery, so that a function as the secondary battery is lost.

In view of the above, an object of one embodiment of the present invention is to provide a separator having desired ionic conductivity and mechanical strength while preventing direct contact between electrodes in a secondary battery. Another object is to achieve long-term reliability of a secondary battery.

Another object of one embodiment of the present invention is to provide a novel structure of a separator in a lithium-ion secondary battery. Another object of one embodiment of the present invention is to provide a novel power storage device or the like.

Another object of one embodiment of the present invention is to provide a secondary battery that can be changed in shape, i.e., a secondary battery having flexibility. Another object is to provide a novel separator which can resist change in shape in a secondary battery having flexibility.

Note that the descriptions of these objects do not disturb the existence of other objects. In one embodiment of the present invention, there is no need to achieve all the objects. Other objects will be apparent from and can lie derived from the description of the specification, the drawings, the claims, and the like.

A structure of one embodiment of the invention disclosed in this specification is a nonaqueous secondary battery including a positive electrode, a negative electrode, an electrolyte solution, a first separator, and a second separator. The first separator and the second separator are provided between the positive electrode and the negative electrode. The first separator is provided with a first pore, the second separator is provided with a second pore, and the size of the first pore is different front the size of the second pore.

Note that the thickness of the first separator may be different from the thickness of the second separator.

A structure of another embodiment of the invention disclosed in this specification is a nonaqueous secondary battery including a positive electrode, a negative electrode, an electrolyte solution, a first separator, a second separator, and a third separator. The first separator is provided between the positive electrode and the negative electrode, the second separator is provided between the first separator and the positive electrode, and the third separator is provided between the first separator and the negative electrode. The first separator is provided with a first pore, the second separator is provided with a second pore, the third separator is provided with a third pore, and the size of the first pore is different from the size of the second pore and the size of the third pore.

A structure of another embodiment of the invention disclosed in this specification is a nonaqueous secondary battery including a positive electrode, a negative electrode, an electrolyte solution, a first separator, a second separator, and a third separator. The first separator is provided between the positive electrode and the negative electrode, the second separator is provided between the first separator and the positive electrode, and the third separator is provided between the first separator and the negative electrode. The first separator is provided with a first pore, the second separator is provided with a second pore, the third separator is provided with a third pore, and the size of the first pore is larger than the size of the second pore and the size of the third pore.

A structure of another embodiment of the invention disclosed in this specification is a nonaqueous secondary battery including a positive electrode, a negative electrode, an electrolyte solution, a first separator, a second separator, and a third separator. The first separator is provided between the positive electrode and the negative electrode, the second separator is provided between the first separator and the positive electrode, and the third separator is provided between the first separator and the negative electrode. The first separator is provided with a first pore, the second separator is provided with a second pore, the third separator is provided with a third pore, and the first pore, the second pore, and the third pore are different in size.

In the nonaqueous secondary battery of the structure of one embodiment of the invention disclosed in this specification, the thickness of the first separator is preferably different from the thickness of the second separator and the thickness of the third separator, and more preferably, smaller than the thickness of the second separator and the thickness of the third separator.

In the nonaqueous secondary battery of the structure of one embodiment of the invention disclosed in this specification, the electrolyte solution may contain a lithium ion. The nonaqueous secondary battery of the structure of one embodiment of the invention disclosed in this specification may further include an exterior body having flexibility and may have flexibility.

In a nonaqueous secondary battery, when separators with a multilayer structure are provided between a positive electrode and a negative electrode, and the separators have pores with different sizes, characteristics of the whole multilayer structure are determined by a property and a thickness of each separator, the proportion of the volume of pores per unit volume of each separator, and the like. A material, a thickness, and the proportion of the volume of the pores per unit volume of each separator included in the multilayer structure, and the like can be selected within a predetermined range. By variously setting properties of the separators, characteristics of the whole multilayer structure as the separator can be set in detail.

For example, in the ease of providing a separator having a predetermined thickness between the positive electrode and the negative electrode, a stack of separators including a first separator which is thick, has a large pore, and has a high proportion of the volume of pores per unit volume and a second separator which is thin, has a small pore, and has a low proportion of the volume of pores per unit volume is provided. The separator with such a structure can have an excellent property of holding an electrolyte solution owing to the second separator and have high ionic conductivity owing to the first separator.

When the separator having a predetermined thickness is formed of only a material of the first separator, the separator has high ionic conductivity while having low ability to prevent electrodes from being connected through a whisker-like lithium deposit (whisker). In addition, the mechanical strength of the separator is low. When the separator having a predetermined thickness is formed of only a material of the second separator, the separator has low ionic conductivity, though the electrodes can be prevented from being connected through the whisker-like lithium deposit (whisker). In the case where a lump of deposit or the like is generated and the size of a pore in the separator is small, the pore Ls easily blocked by the deposit or the like, which further decreases ionic conductivity.

Because there is a limitation on a material to be used for the separator and a properly of the separator material, it is difficult to form a necessary separator in some eases. In the case of using the multilayer separator having different properties, characteristics of the separator can be selected from a wider range than in the ease of using the separator formed of a single material.

In the case where a flexible secondary battery including the multilayer separator is changed in shape, stress to be generated in the separator can be relieved by the occurrence of sliding between the layers. Thus, the secondary battery including the multilayer separator has high resistance to change in shape. The structure including the multilayer separator is suitably used for the flexible secondary battery.

Furthermore, when the flexible secondary battery is changed in shape in a state where a whisker-like structure (whisker) that has grown from the negative electrode and penetrated through the interface between the two separators exists continuously in the two separators in the flexible secondary battery, the whisker-like structure (whisker) cannot endure sliding that occurs between the two separators because of change in the shape of the secondary battery, and thus, the whisker-like structure (whisker) is broken by shear at the interface between the separators. In this manner, connection (short-circuit) between the electrodes due to the whisker-like structure (whisker) can be prevented.

lire exterior body of the flexible secondary battery of one embodiment of the present invention can be changed in shape in the range of radius of curvature of 10 mm or more, preferably 30 mm or more. The exterior body of the secondary battery is formed of one film or two films. In the case where the secondary battery has a layered structure, a cross-sectional structure of the battery that is bent is surrounded by two curves of the film serving as the exterior body.

Description is given of the radius of curvature of a surface with reference to FIGS. 17A to 17C. In FIG. 17A, on a plane 1701 along which a curved surface 1700 is cut, part of a curve 1702, which is a form of the curved surface, is approximate to an are of a circle, and the radius of the circle is referred to us a radius 1703 of curvature and the center of the circle is referred to as a center 170-4 of curvature. FIG. 17B is a top view of the curved surface 1700. FIG. 17C is a cross-sectional view of the curved surface 1700 taken along the plane 1701. When a curved surface is cut along a plane, the radius of curvature of a curve, which is a form of the curved surface, depends on plane along which the curved surface is cut Here, the radius of curvature of a curved surface is defined as the radius of curvature of a curve, which is a cross-sectional form of the curved surface, on a plane along which the cursed surface is cut such that the curve has the smallest radius of curvature.

In the case of curving a secondary battery in which a component 1805 including electrodes and an electrolyte solution is sandwiched between two films as exterior bodies, a radius 3802 of curvature of a film 1801 close to a center 1800 of curvature of the secondary battery is smaller than a radius 1804 of curvature of a film 1803 far from the center 1800 of curvature (FIG. 18A). When the secondary battery is curved and has an arc-shaped cross section, compressive stress is applied to a surface of the film close to the center 3800 of curvature and tensile stress is applied to a surface of the film far from the center 1800 of curvature (FIG. 18B). However, by forming a pattern of projections and depressions on surfaces of the exterior bodies, influence of distortion can be reduced to be acceptable even when the compressive stress and the tensile stress are applied For this reason, the secondary battery can change its form such that the exterior body on the side closer to the center of curvature has a curvature radius greater than or equal to 10 mm, preferably greater than or equal to 30 mm.

Note that the cross-sectional shape of the secondary battery is not limited to a simple arc shape, and the cross section can be partially arc-shaped; for example, a shape illustrated in FIG. 18C, a wavy shape illustrated in FIG. 18D, and an S shape can be used. When the curved surface of the secondary battery has a shape with a plurality of centers of curvature, the secondary battery can change its form such that a curved surface with the smallest radius of curvature among radii of curvature with respect to the plurality of centers of curvature, which is a surface of the exterior body on the side closer to the center of curvature, has a curvature radius greater than or equal to 10 mm, preferably greater than or equal to 30 mm.

One embodiment of the present invention can provide a separator having desired ionic conductivity and mechanical strength while preventing direct contact between electrodes in a secondary battery. One embodiment of the present invention can provide can achieve long-term reliability of a secondary battery.

One embodiment of the present invention can provide a novel structure of a separator in a lithium-ion secondary battery. One embodiment of the present invention can provide a novel power storage device or the like.

One embodiment of the present invention can provide a secondary battery that can be changed in shape, i.e., a secondary battery having flexibility. One embodiment of the present invention can provide a novel separator which can resist change in shape in a secondary battery having flexibility.

Note that the description of these effects does not disturb the existence of other effects. One embodiment of the present invention does not necessarily achieve all the effects listed above. Other effects will be apparent from and can be derived from the description of the specification, the drawings, the claims, and the like.

BRIEF DESCRIPTION OF THE DRAWINGS

FIGS. 9A1, 9A2, 9B1, and 9B2 illustrate examples of a power storage device.

DETAILED DESCRIPTION OF THE INVENTION

Figure 1A:
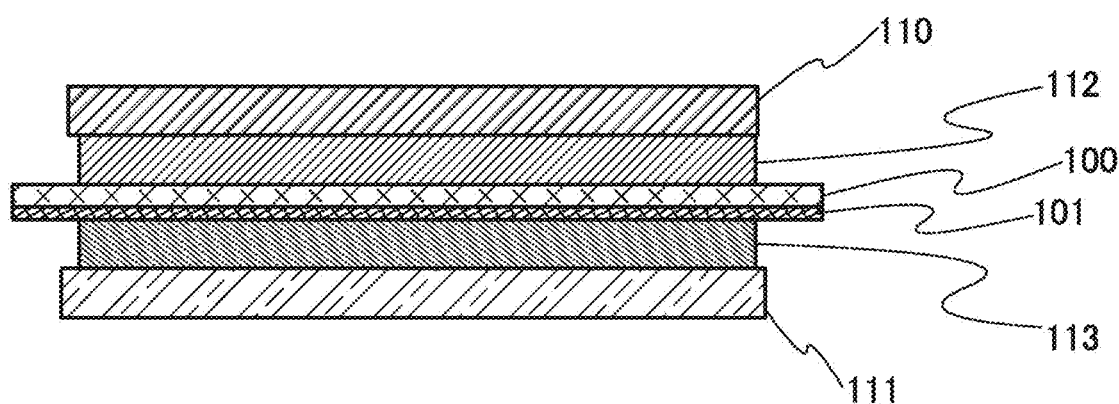
FIGS. 1A to 1C are cross-sectional schematic views showing one embodiment of the present invention.

Embodiments of the present invention will be described below in detail with reference to the drawings. However, the present invention is not limited to the description below, and it is easily understood by those skilled in the art that modes and details disclosed herein can be modified in various ways. Further, the present invention is not construed as being limited to description of the embodiments.

Note that in each drawing described in this specification, the size of each component, such as the thickness and the size of a positive electrode, a negative electrode, an active material layer, an exterior body, and the like is exaggerated for clarity in some cases. Therefore, the sizes of the components are not limited to the sizes in the drawings and relative sizes between the components.

Ordinal numbers such as "first", "second", and "third" are used for convenience and do not denote the order of steps or the stacking order of layers. Therefore, for example, description can be made even when "first" is replaced with "second", "third", or the like as appropriate. In addition, the ordinal numbers in this specification and the like are not necessarily the same as those which specify one embodiment of the present invention.

Note that in the structures of the present invention described in this specification and the like, the same portions or portions having similar functions in different drawings are denoted by the same reference numerals, and description of such portions is not repeated. Further, the same hatching pattern is applied to portions having similar functions, and the portions are not especially denoted by reference numerals in some cases.

in this specification and the like, the phrase "pore in a separator" refers to a region without a separator material in a layer or a film including the separator material. The term "separator" refers to a separator provided with a pore or refers to a separator material which is distinguished from a pore. There is no particular limitation on whether the shape of fixe pore is a shape having a correlation with a given direction or an isotropic shape. There is no limitation on whether or not one pore penetrates through a layer including the separator material and whether or not one pore is a closed space surrounded by the separator material. The phrase "pore in a separator" also refers to a pore which is wholly or partly filled with an electrolyte solution in a secondary battery.

The descriptions in embodiments for the present invention can be combined with each other as appropriate.

Embodiment 1

Description is given below of a method for manufacturing a lithium-ion secondary battery of one embodiment of the present invention with reference to FIG. 1A first, a cross-sect usual schematic view of a stack of a positive electrode current collector 110, a positive electrode active material layer 112, a first separator 100, a second separator 101, a negative electrode active material layer 113, and a negative electrode current collector 111 is shown. Details of the current collector and the active material layer are described later. Note that the active material layer can be formed on both surfaces of the current collector, und the secondary battery can have a stacked-layer structure.

Figure 1B:
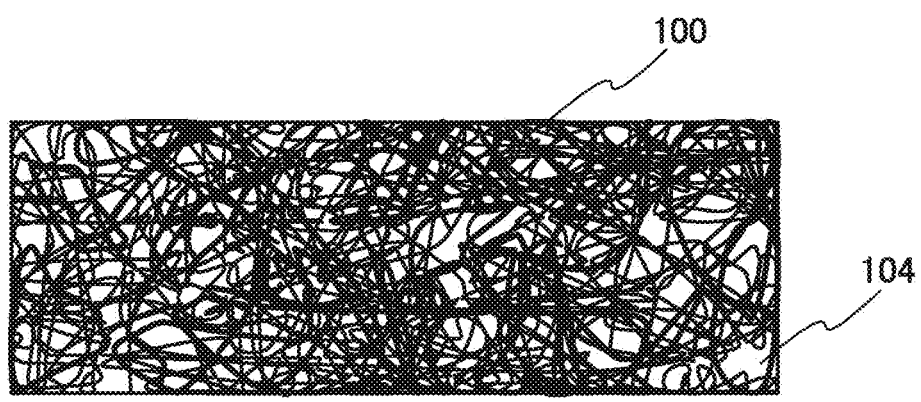
Figure 1C:
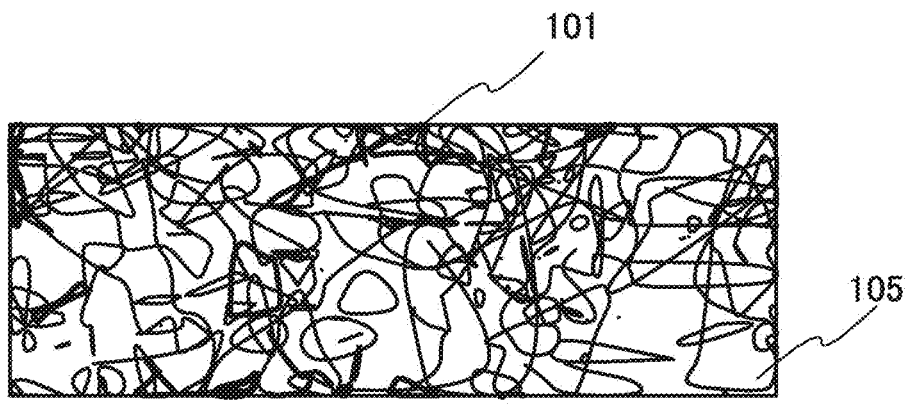

FIGS. 1B and 1C are enlarged cross-sectional schematic views of the first Separator 100 and the second separator 101, respectively The first separator 100 and the second separator 101 have a first pore 104 and a second pore 105, respectively. The size of the first pore 104 is different from that of the second pore 105. The proportion of the volume of the first pores 104 in the first separator 100 is different from the proportion of the volume of the second pores 105 in the second separator 101. Note that in the schematic views, each separator has a fibrous structure and the pore is shown as an interstice between fibers; however, the structure of the separator is not limited to a fibrous structure.

As shown in FIG. 1A, the first separator 100 and the second separator 101 have different thicknesses. Therefore, the first separator 100 and the second separator 101 are different from each other in characteristics as a separator, such as ionic conductivity, mechanical strength, and insulation performance. Note that even when the first separator 100 and the second separator 101 are formed using the same material, different characteristics may be provided for the separators by changing a formation method, formation conditions, or the like.

The separator may be formed using a material such as paper, nonwoven fabric, a glass fiber, a synthetic fiber such as nylon (polyimide), vinylon (a polyvinyl alcohol based fiber), polyester, acrylic, polyolefin, or polyurethane. However, a material which does not dissolve in an electrolyte solution described later should be selected.

More specifically, as a material for the separator, high-molecular compounds based on fluorine-based polymer, polyether such as polyethylene oxide and polypropylene oxide, polyolefin such as polyethylene and polypropylene, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and polyurethane, derivatives thereof, cellulose, paper, nonwoven fabric, and a glass fiber can be used either alone or in combination.

The separator needs to have insulation performance that prevents connection between the electrodes, performance that holds the electrolyte solution, and ionic conductivity. As a method for forming a film having a function as a separator, a method for forming a film by stretching is given. Examples of the method include a Stretching aperture method in which a melted polymer material is spread, heat is released from the material, and pores are formed by stretching the resulting film in the directions of two axes parallel to the film. Note that the range of the thickness of the film and the size of the pore in the film of the separator obtained by stretching is limited by a material of the separator and mechanical strength of the film.

In this embodiment, the first separator 100 and the second separator 101 in the secondary battery can be formed by a stretching method. The first separator 100 and the second separator 101 can be formed using one or more kinds of material selected from the above-described materials or materials other than those described above. Characteristics such as the size of the pore in the film, the proportion of the volume of the pores in the film (also referred to as porosity), and the thickness of the film can be determined by film formation conditions, film stretching conditions, and the like. By using the first separator 100 and the second separator 101 having different characteristics, the performance of the separators of the secondary battery can be selected more variously than in the case of using one of the separators.

For example, in the secondary battery including the first separator 100 and the second separator 101 as the separator, the second separator 101 is formed using a film in which the size of the pore is smaller, the proportion of the volume of the pores in the film (porosity) is lower, and the thickness of the film is smaller than those of the first separator 100. In that case, the second separator 101 can obtain insulation performance that prevents, for example, connection between a positive electrode and a negative electrode through a whisker-like Li structure (whisker), whereas the first separator 100 having a large thickness can obtain high ionic conductivity. That is, the first separator 100 and the second separator 101 can have different functions.

Figure 2A:
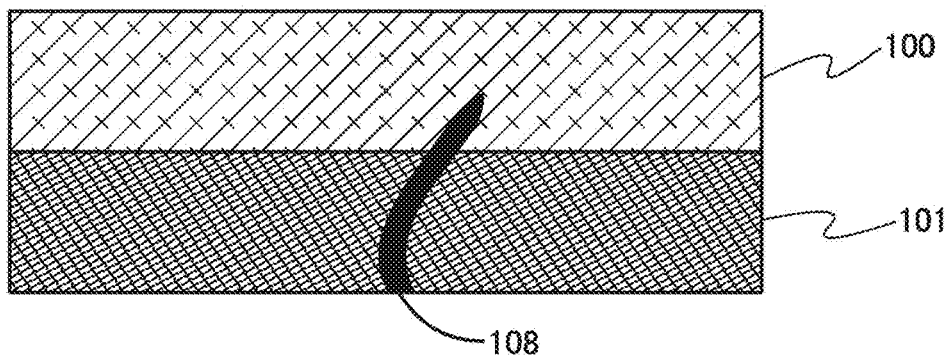
FIGS. 2A and 2B are cross-sectional schematic views showing shearing of a whisker-like structure.
Figure 2B:
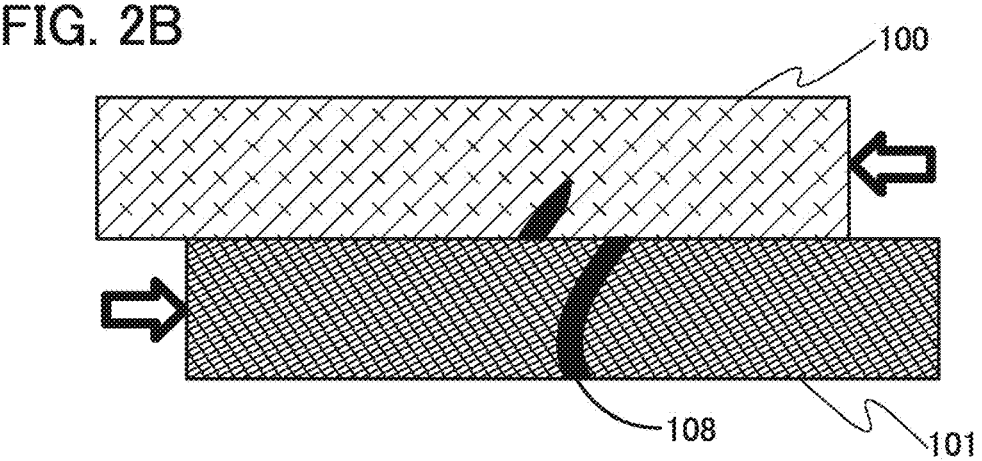

The structure including the two separators is also suitable as a structure of a separator in a flexible secondary battery. In the case where flow stress is applied to the secondary battery, the stress can be relieved by sliding of the first separator 100 and the second separator 101 at the interface between the separators. Furthermore, in the case where the flexible secondary battery includes a whisker-like structure (whisker) 108 that has grown from the negative electrode and penetrated through the interface between the separators (FIG. 2A), the whisker-like structure (whisker) 108 cannot endure sliding that occurs between the two separators because of change in the shape of the secondary battery, and thus, the whisker-like structure (whisker) 108 is broken by shear at the interface between the separators. In this manner, connection (short-circuit) between the electrodes due to the whisker-like structure (whisker) 108 can be prevented (FIG. 2B). An outline arrow shown in FIG. 2B indicates the sliding of each separator.

As a method for forming a structure including the two separators, there is a method in which two layers each including a film containing a separator material are stretched to form pores in both of the layers. In this method, the two layers are Stretched under the same conditions: therefore, the sizes of the pores formed in the separators may be similar to each other and the proportions of the volume of the pores (porosity) in the separators may be similar to each other, therefore, in some eases, it is difficult to obtain the separators different in performance. Note that one embodiment of the present invention docs not necessarily exclude a stack of separators formed by the method.

As a method for incorporating the two separators into a secondary battery, after the two separators are stacked, the separators can be provided between the positive electrode and the negative electrode which are to be described later. Alternatively, after one separator is placed on each of the positive electrode and the negative electrode, the electrodes can be stacked. Further alternatively, after a first separator and a second separator is placed on one of the positive electrode and the negative electrode, the other of the positive electrode and the negative electrode can be stacked thereon. A cross-sectional schematic view of the secondary battery including the two separators is shown in FIG. 1A.

Figure 15A:
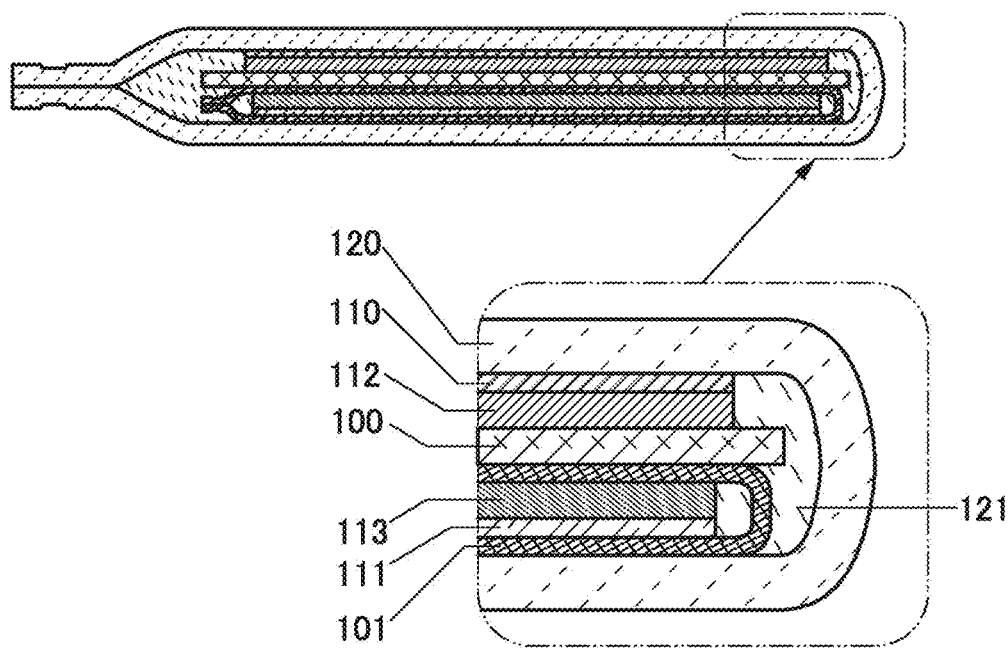
FIGS. 15A and 15B are cross-sectional schematic views showing one embodiment of the present invention.
Figure 15B:
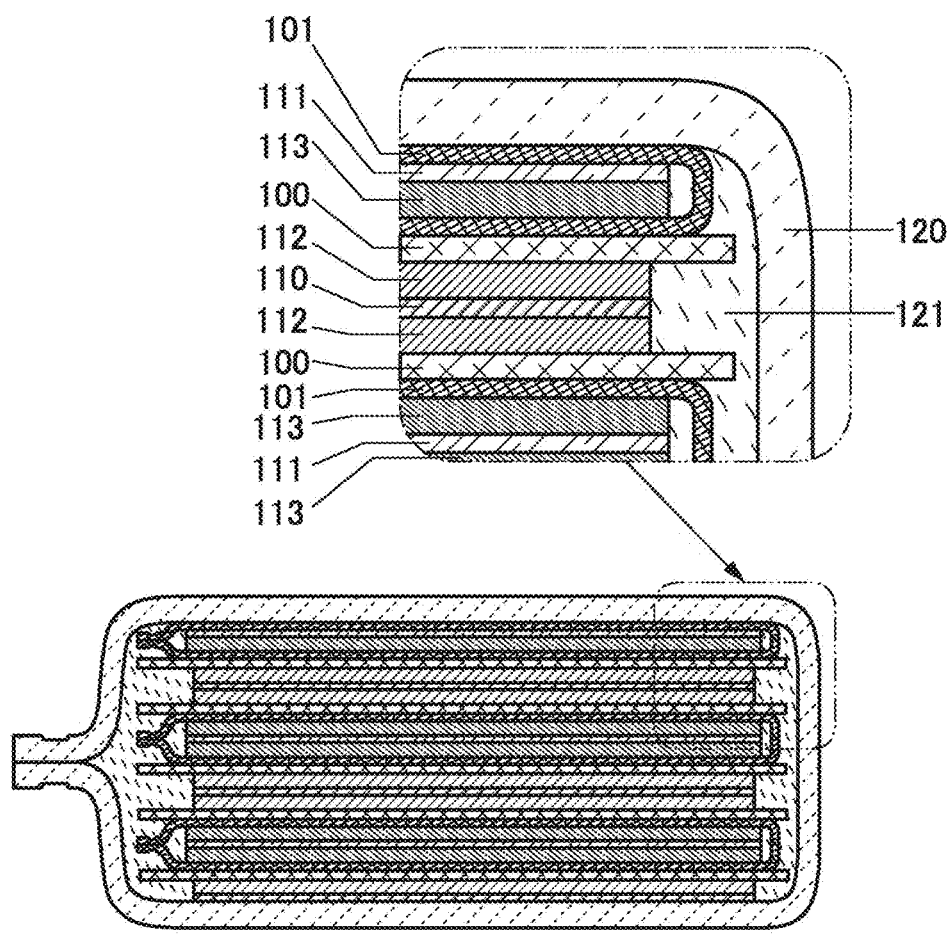

In the case where the second separator 101 is formed into a sheet-like shape large enough to cover both surfaces of the negative electrode or into an envelope-like shape to envelop the negative electrode, the negative electrode can be protected from mechanical damage and can be easily handled in manufacturing the secondary battery. The first separator 100 is provided between the negative electrode enveloped by the second separator 101 and the positive electrode active material layer 112, the resulting component is stored in the exterior body 120, and the exterior body 120 is filled with the electrolyte solution 121. In this manner, the secondary battery can be manufactured. FIGS. 15A and 15B show cross-sectional structures of secondary batteries each including the second separator 101 having an envelope-like shape. FIG. 15A shows a cross-sectional structure of the secondary battery including a pair of the positive electrode and the negative electrode. A secondary battery having a stacked-layer structure including a plurality of pairs of the positive electrode and the negative electrode can be manufactured. FIG. 15B shows a cross-sectional structure of the secondary battery having a stacked-layer structure. In the secondary battery having a stacked-layer structure, the electrode active material is formed on both surfaces of the current collector, and the resulting component is enveloped by an envelope-like separator.

The first separator and the second separator slide against each other in a flexible secondary battery in some eases as described below; in view of this, the first separator and the second separator are not fixed.

Figure 3A:
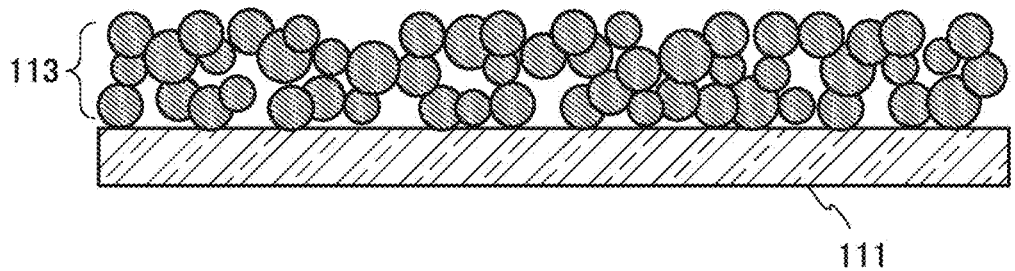
FIGS. 3A and 3B are cross-sectional schematic views showing a current collector and an active material.

The negative electrode is described with reference to FIG. 3A. The negative electrode includes at least the negative centrode active material layer 113 and the negative electrode current collector 111. In this embodiment, steps of forming the negative electrode with the use of a carbon-based material as a material for the negative electrode active material layer 113 are described below. Note that in FIG. 3A, the negative electrode active material is in the form of particles. For this reason, the negative electrode active material is schematically illustrated as circles in FIG. 3A; however, the shape of the negative electrode active material is not limited to this shape. Furthermore, although the particles of the negative electrode active material having several sizes are schematically shown, the sizes may vary. Steps of forming the negative electrode are described below.

Examples of the carbon-based material as the negative electrode active material include graphite, graphitizing carbon (soft carbon), non-graphitizing carbon (hard carbon), a carbon nanotube, graphene, and carbon black. Examples of the graphite include artificial graphite such as meso-carbon microbeads (MCMB), coke-based artificial graphite, or pitch-based artificial graphite and natural graphite such as spherical natural graphite In addition, the shape of the graphite is a flaky shape or a spherical shape, for example.

Other than the carbon-based material, a material which enables charge-discharge reaction by alloying and dealloying reaction with lithium can be used as the negative electrode active material, for example, a material including at least one of Ga, Si, Al, Ge, Sn, Pb, Sb, Bi, Ag, Zn, Cd, In, and the like can be used. Such elements have higher capacity than carbon. In particular, silicon is preferable because of high theoretical capacity of 4200 mAh/g. Examples of an alloy-based material using such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, $InSb$, $SbSn$, and the like.

Alternatively, us the negative electrode active material, oxide such as SiO, SnO, $SnO_2$, titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), molybdenum oxide ($MoO_2$), or the like can be used.

Further alternatively, as the negative electrode active material, $Li_{3-x}M_xN$ (M is Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used as the negative electrode active material. For example, a transition metal oxide with which an alloying reaction with lithium is not caused, such as cobalt oxide (CoO), nickel oxide (NiO), or iron oxide (FeO), may be used for the negative electrode active material. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

The particle diameter of the negative electrode active material is preferably greater than or equal to 50 nm and less than or equal to 100 μm, for example.

Examples of a conductive additive of the electrode include acetylene black (AB), graphite (black lead) particles, carbon nanotubes, graphene, and fullerene.

A network for electron conduction can be formed in the electrode by the conductive additive. The conductive additive also allows maintaining of a path for electric conduction between the particles of the negative electrode active material. The addition of the conductive additive to the negative electrode active material layer increases the electron conductivity of the negative electrode active material layer 113.

As a binder, instead of polyvinylidene fluoride (PVDF) as a typical one. polyimide, polytetrufluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, nitrocellulose, or the like can be used.

The content of the binder in the negative electrode active material layer 113 is preferably greater than or equal to 1 wt % and less than or equal to 10 wt %, more preferably greater than or equal to 2 wt % and less than or equal to 8 wt %, and still more preferably greater than or equal to 3 wt % and less than or equal to 5 wt %. The content of the conductive additive in the negative electrode active material layer 113 is preferably greater than or equal to 1 wt % and less than or equal to 10 wt %, more preferably greater than or equal to 1 wt % and less than or equal to 5 wt %.

Next, the negative electrode active material layer 113 is formed on the negative electrode current collector 111. In the case where the negative electrode active material layer 113 is formed by a coating method, the negative electrode active material, the binder, the conductive additive, and a dispersion medium are mixed to form an electrode paste (slurry), and the electrode paste is applied to the negative electrode current collector 111 and dried. If necessary, pressing may be performed after the drying.

In this embodiment, copper foil is used as the negative electrode current collector 111, and a mixture of MCMB and PVDF as the binder is used as the slurry.

The negative electrode current collector 111 can be formed using a material, which has high conductivity and is not alloyed with carrier ions of lithium or the like, such as stainless steel, gold, platinum, zinc, iron, copper, titanium, tantalum, or an alloy thereof. Still alternatively, a metal element which forms silicide by reacting with silicon can be used. Examples of the metal clement which forms silicide by reacting with silicon include zirconium, titanium, hafnium, vanadium, niobium, tantalum, chromium, molybdenum, tungsten, cobalt, nickel, and the like. The negative electrode current collector 111 can have a foil-like shape, a plate-like shape (sheet-like shape), a net-like shape, a cylindrical shape, a coil shape, a punching-metal shape, an expanded-metal shape, or the like as appropriate. The negative electrode current collector 111 preferably has a thickness greater than or equal to 5 μm and less than or equal to 30 μm. A part of the surface of the electrode current collector may be provided with an undercoat layer using graphite or the like.

Through the above steps, the negative electrode of the lithium-ion secondary battery can be formed.

Figure 3B:
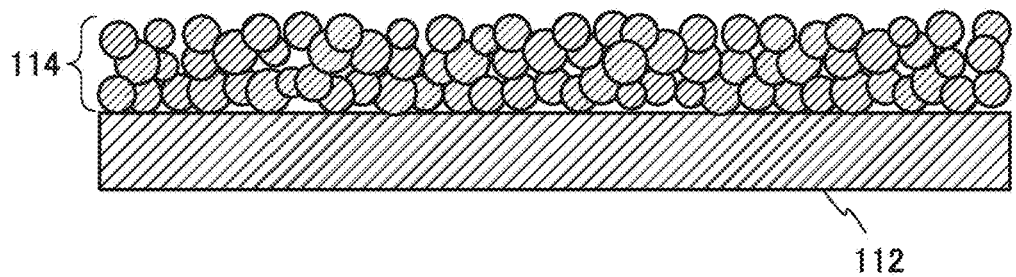

The positive electrode is described. The positive electrode includes at least the positive electrode active material layer 112 and the positive electrode current collector 110. In this embodiment, steps of forming the positive electrode with the use of lithium iron phosphate ($LiFePO_4$) as the positive electrode active material layer 112 are described below. Note that in FIG. 3B, the positive electrode active material is in the form of panicles For this reason, the positive electrode active material is schematically illustrated as circles in FIG. 3B; however, the shape of the positive electrode active material is not limited to this shape. Although the particles of the positive electrode active material having several uniform sizes are schematically shown, the sizes may vary. Steps of forming the positive electrode are described below.

As the positive electrode active material, a material into/from which carrier ions such as lithium ions can be inserted and extracted is used, and examples of the material include a lithium-containing material having an olivine crystal structure, a layered rock-salt crystal structure, or a spinel crystal structure.

Typical examples of the lithium-containing material with an olivine crystal structure (general formula: $LiMPO_4$ (M is Fe(II), Mn(II), Co(II), or Ni(II))) include $LiFePO_4$, $LiNiPO_4$, $LiCoPO_4$, $LiMnPo_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 021 c<1, 0<d<1, and 0<e<1), and $LiFe_fNi_gCo_hMn_iPO_4$ (f+g+h+i≤1, 0<f<1, 0<g<1, 0<h<1, and 0<i<1).

$LiFePO_4$ is particularly preferable because it properly satisfies conditions necessary for the positive electrode active material, such as safety, stability, high capacity density, high potential, and the existence of lithium ions which can be extracted in initial oxidation (charging).

Examples of the lithium-containing material with a layered rock-salt crystal Structure include lithium cobalt oxide ($LiCoO_2$); $LiNiO_3$; $LiMnO_2$; $Li_2MNO_3$; an NiCo-based lithium-containing material (a general formula thereof is $LiNi_xCo_{1-x}O_2$ (0<x<1)) such as or $LiNi_{0.8}Co_{0.2}O_2$; an NiMn-based lithium-containing material (a general formula thereof is $LiNi_xMn_{1-x}O_2$ (0<x<1)) such as $LiNi_{0.5}Mn_{0.5}O_2$; and an NiMnCo-based lithium-containing material (also referred to as NMC, and a general formula thereof is $LiNi_xMn_yCo_{1-x-y}O_2$ (x>0, y>0, x+y<1) such as $LiNi_{1/3}Mn_{1/3}Co_{1/3}O_2$. Moreover, $Li(Ni_{0.8}Co_{0.15}Al_{0.05})O_2$, $Li_2MnO_3$-$LiMO_2$ (M=Co, Ni or Mn), and the like can be given as the examples.

$LiCoO_2$ is particularly preferable because it has high capacity, stability in the air higher than that of $LiNiO_2$, and thermal stability higher than that of $LiNiO_2$, for example.

Examples of the lithium-containing material with a spinel crystal structure include $LiMn_2O_4$, $Li_{1+x}Mn_{2-y}O_4$, $Li(MnA)_2 O_4$, and $LiMn_{1.5}Ni_{0.5}O_4$.

It is preferable to add a small amount of lithium nickel oxide (LiNiO or LiNi$_{1-x}$MO$_2$ (M=Co, Al, or the like)) to a lithium-containing material with a spinel crystal structure which contains manganese such as LiMn$_2$O$_4$ because advantages such as minimization of the elution of manganese and the decomposition of an electrolyte solution can be obtained.

Alternatively, as the positive electrode active material, a composite oxide represented by a general formula Li$_{(2-j)}$MSiO$_4$ (M is Fe(II), Mn(II), Co(II), or Ni(II), 0≤j≤2) can be used. Typical examples of Li$_{(2-j)}$MSiO$_4$ (general formula) are Li$_{(2-j)}$FeSiO$_4$, Li$_{(2-j)}$NiSiO$_4$, Li$_{(2-j)}$CoSiO$_4$, Li$_{(2-j)}$MnSiO$_4$, Li$_{(2-j)}$Fe$_k$Ni$_l$SiO$_4$, Li$_{(2-j)}$Fe$_k$Co$_l$SiO$_4$, Li$_{(2-j)}$Fe$_k$Mn$_l$SiO$_4$, Li$_{(2-j)}$Ni$_k$Co$_l$SiO$_4$, Li$_{(2-j)}$Ni$_k$Mn$_l$SiO$_4$ (k+≤1, 0<k<1, and 0<l<1), Li$_{(2-j)}$Fe$_m$Ni$_n$Co$_q$SiO$_4$, Li$_{(2-j)}$Fe$_m$Ni$_n$Mn$_q$SiO$_4$, Li$_{(2-j)}$Ni$_m$Co$_n$Mn$_q$SiO$_4$ (m+n+q≤1, 0<m<1, 0<n<1, and 0<q<1), and Li$_{(2-j)}$Fe$_r$Ni$_s$Co$_t$Mn$_u$SiO$_4$ (r+s+t+u≤1, 0<r<1, 0<s<1, 0<t<1, and 0<u<1).

Still alternatively, a nasicon compound expressed by A$_x$M$_2$(XO$_4$)$_3$ (general formula) (A=Li, Na, or Mg, M=Fe, Mn, Ti, V, Nb. or Al, X=S, P, Mo, W, As, or Si) can be used as the positive electrode active material. Examples of the nasicon compound are Fe$_2$(MnO$_4$)$_3$, Fe$_2$(SO$_4$)$_3$, and Li$_3$Fe$_2$(PO$_4$)$_3$. Still further alternatively, a compound represented by a general formula, Li$_2$MPO$_4$F, Li$_2$MP$_2$O$_7$, or Li$_5$MO$_4$ (M=Fe or Mn), a perovskite fluoride such as NaF$_3$ or FeF$_3$, a metal chalcogenide (a sulfide, a selenite, or a telluride) such as TiS$_2$ or MoS$_2$, a lithium-containing material with an inverse spinel crystal structure such as LiMVO$_4$, a vanadium oxide-based (e.g., V$_2$O$_5$, V$_6$O$_{13}$, or LiV$_3$O$_8$), a manganese oxide, or an organic sulfur compound can be used as the positive electrode active material, for example.

In the case where carrier ions are alkali metal ions other than lithium ions or alkaline-earth metal ions, the following may be used as the positive electrode active material: a compound or oxide which is obtained by substituting an alkali metal (e.g., sodium or potassium) or an alkaline-earth metal (e.g., calcium, strontium, barium, beryllium, or magnesium) for lithium in any of the above-described compounds or oxides. For example, the positive electrode active material may be a layered oxide containing sodium such as NaFcO$_2$ or Na$_{2/3}$[Fe$_{1/2}$Mn$_{1/2}$]O$_2$.

Further alternatively, any of the aforementioned materials may be combined to be used as the positive electrode active material. For example, a solid solution containing any of the aforementioned materials, e.g., a solid solution containing LiCo$_{1/3}$Mn$_{1/3}$Ni$_{1/3}$O$_2$ and Li$_2$MnO$_3$ may be used.

The average particle diameter of the primary particle of the positive electrode active material is preferably greater than or equal to 50 nm and less than or equal to 100 μm.

Examples of the conductive additive of the electrode include acetylene black CAB), graphite (black lead) particles, carbon nanotubes, graphene, and fullerene.

A network for electron conduction can be formed in the electrode by the conductive additive. The conductive additive also allows maintaining of a path for electric conduction between the panicles of the positive electrode active material. The addition of the conductive additive to the positive electrode active material layer increases the electron conductivity of the positive electrode active material layer 112.

As the binder, instead of PVDF as a typical one, polyimide. polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, nitrocellulose, or the like can be used.

The content of the binder in the positive electrode active material layer 112 is preferably greater titan or equal to 1 wt % and less than or equal to 10 wt %, more preferably greater than or equal to 2 wt % and less than or equal to 8 wt %, and still more preferably greater than or equal to 3 wt % and less than or equal to 5 wt %. The content of the conductive additive in the positive electrode active material layer 112 is preferably greater than or equal to 1 wt % and less than or equal to 10 wt %, more preferably greater than or equal to 1 wt % and less than or equal to 5 wt %.

In the case where the positive electrode active material layer 112 is formed by a coating method, the positive electrode active material, the binder, the conductive additive, and the dispersion medium are mixed to form an electrode paste (slurry), and the electrode paste may be applied to the positive electrode current collector 110 and dried. In this embodiment, a metal material including aluminum as its main component is preferably used as the negative electrode current collector 111.

The positive electrode Current collector can be formed using a material, which has high conductivity and is not alloyed with carrier ions of lithium or the like, such as stainless steel, gold, platinum, aluminum, or titanium, or an alloy thereof. Alternatively, an aluminum alloy to which an element which improves heat resistance. Such as silicon, titanium, neodymium, scandium, or molybdenum, is added can be used. Still alternatively, a metal clement which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The positive electrode current collector can have a foil-like shape, a plate-like shape (sheet-like shape), a net-like shape, a punching-metal shape, an expanded-metal shape, or the like as appropriate.

Through the above steps, the positive electrode of the lithium-ion secondary battery can be formed.

A thin lithium-ion secondary battery can be manufactured using the first separator, the second separator, the positive electrode, the negative electrode, and the electrolyte solution which are obtained in this embodiment. The first separator, the second separator, the positive electrode, and the negative electrode are incorporated in the secondary battery as described above.

The electrolyte solution used in the lithium-ion secondary battery is preferably a nonaqueous solution (solvent) containing an electrolyte (solute).

As a solvent for the electrolyte solution, an aptotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1.4-dioxane, dimethoxyethane (DME) dimethyl sulfoxide, diethyl ether, methyl diglyme, acetonitrile, benzonitrile, tetrahydrofuran, sulfolane, and sultone can be used or two or more of these solvents can be used in an appropriate combination in an appropriate ratio.

When a gelled polymer material is used as the solvent of the electrolyte solution, safety against liquid leakage and the like is improved. Further, the lithium-ion secondary battery can be thinner and more lightweight. Typical examples of the gelled high-molecular material include a silicone gel, an acrylic gel, an acrylnitrile gel, polyethylene oxide, polypropylene oxide, a fluorine-based polymer, and the like.

Alternatively, the use of one or more of ionic liquids (room temperature molten salts) that have non-flammability and non-volatility as the solvent for the electrolyte solution can prevent a lithium-ion secondary battery from exploding or catching fire even when the lithium-ion secondary battery internally shorts out or the internal temperature increases due to overcharging or the like. Thus, the lithium-ion secondary battery has improved safety.

Examples of an electrolyte dissolved in the above-described solvent are one of lithium salts such as $LiPF_6$, $LiClO_4$, $LiAsF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$, or two or more of these lithium salts in an appropriate combination in an appropriate ratio.

Although the ease where carrier ions are lithium ions in the above electrolyte is described, carrier ions other than lithium ions can be used. When the carrier ions other than lithium ions are alkali metal ions or alkaline-earth metal ions, instead of lithium in the lithium salts, an alkali metal (e.g., sodium or potassium) or an alkaline-earth metal (e.g., calcium, strontium, barium, beryllium, or magnesium) may be used for the electrolyte.

The electrolyte solution used for the secondary battery preferably contains a small amount of dust particles and elements other than the constituent elements of the electrolyte solution (hereinafter, also simply referred to as impurities) so as to be highly purified. Specifically, the weight ratio of impurities to the electrolyte solution is less than or equal to 1%, preferably less than or equal to 0.1%, and more preferably less than or equal to 0.01%. An additive agent such as vinylene carbonate may be added to the electrolyte solution.

When the positive electrode, the negative electrode, the first separator, and the second separator in this embodiment are each formed using a flexible material, the secondary battery can have flexibility. In the flexible secondary battery, when flow stress is applied to the secondary battery, the first separator 100 and the second separator 101 are shifted from each other at the interface between the separators, whereby the stress can be relieved.

Note that one embodiment of the present invention can be used for various power storage devices. Examples of such a power storage device include a battery, a primary battery, a secondary battery, a lithium-ion secondary battery, a lithium air battery, a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, and an air battery. In addition, a capacitor is given as another example of the power storage devices. For example, with a combination of the negative electrode of one embodiment of the present invention and an electric double layer positive electrode, a capacitor such as a lithium ion capacitor can be manufactured.

Note that this embodiment can be implemented in free combination with any of the other embodiments.

Embodiment 2

Figure 4A:
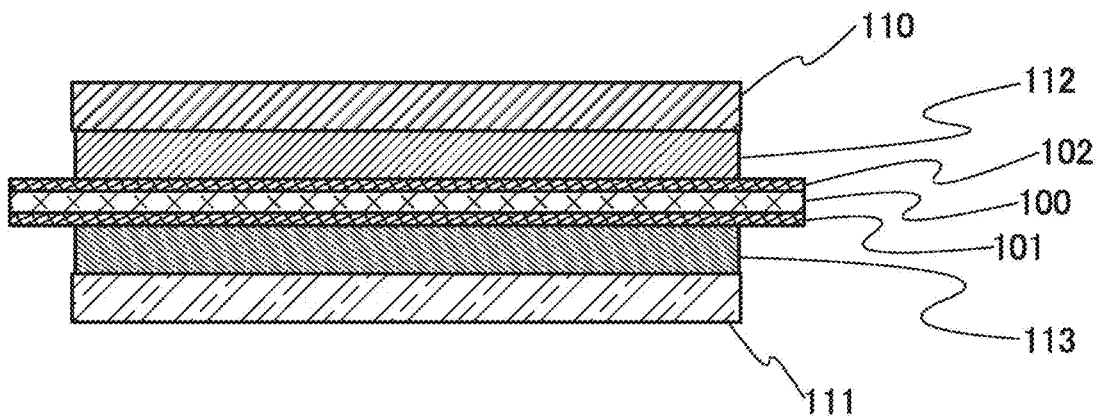
FIGS. 4A to 4D are cross-sectional schematic views showing one embodiment of the present invention.

In this embodiment, a method for manufacturing a lithium-ion secondary battery of one embodiment of the present invention is described below with reference to FIG. 4A. First, a cross-sectional schematic view of a stack of the positive electrode current collector 110, the positive electrode active material layer 112, the second separator 101, the first separator 100, a third separator 102, the negative electrode active material layer 113, and the negative electrode current collector 111 is shown. Note that the active material layer can be formed on both surfaces of the current collector, and the secondary battery can have a stacked-layer structure.

Figure 4B:
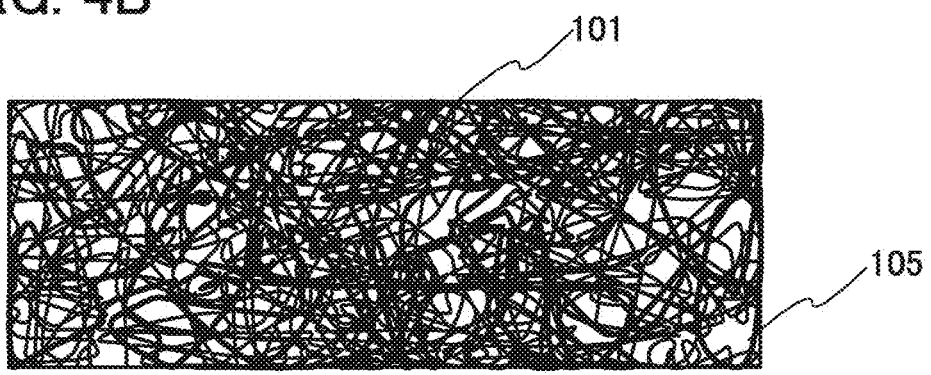
Figure 4C:
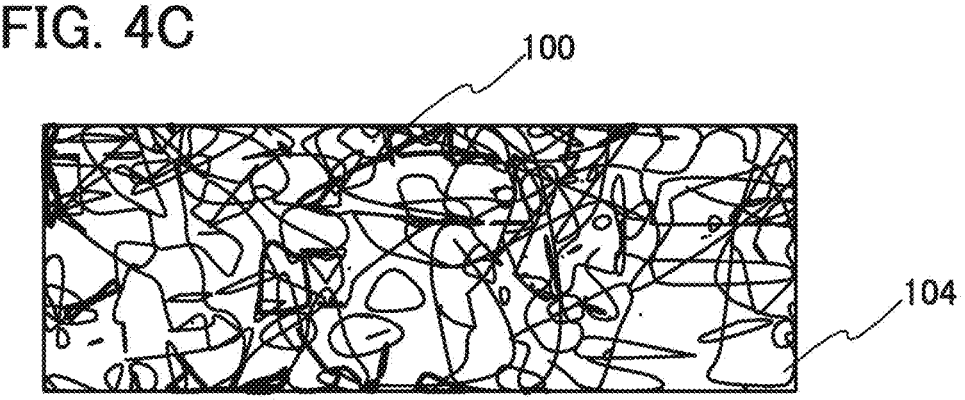
Figure 4D:
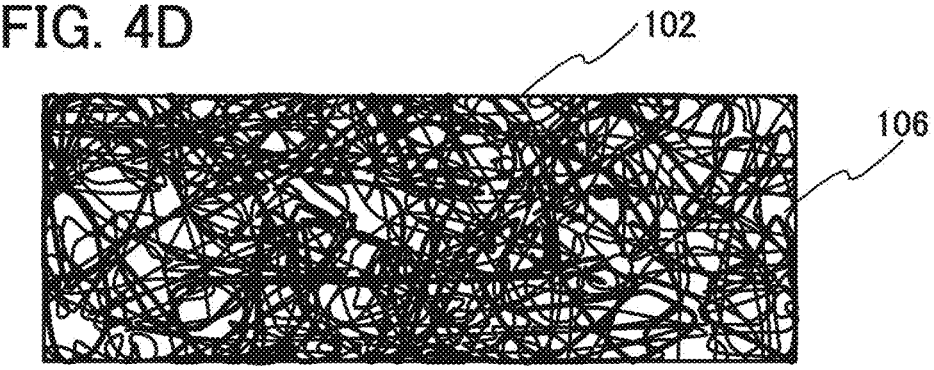

FIGS. 4B. 4C, and 4D are enlarged cross-sectional schematic views of the second separator 101, the first separator 100, and the third separator 102, respectively. The first separator 100, the second separator 101, and the third separator 102 have the first pore 104, the second pore 105, and a third pore 106, respectively. Note that in the schematic views, each separator has a fibrous structure and the pore is shown as an interstice between fibers; however, the structure of the separator is not limited to a fibrous structure. The proportion of the volume of the first pores 104 in the first separator 100, the proportion of the volume of the second pores 105 in the second separator 101, and the proportion of the volume of the third pores 106 in the third separator 102 can be considered to be elements contributing to the characteristics of the separators. The characteristics as the separator, such as ionic conductivity and mechanical strength, can be determined by the size of the pore and the proportion of the volume of the pores (porosity) in each separator.

Each separator can be formed using the material and the method described in Embodiment 1. For example, in the case where the second separator 101 and the third separator 102 having the same thickness are formed using the same material and the same method whereas the first separator 100 is formed using a material or a method which is different from that of the second separator 101 and the third separator 102, the first pore 104 in the first separator 100 can be made larger than the second pore 105 in the second separator 101, the proportion of the volume of the first pores 104 in the first separator 100 can be made higher than the proportion of the volume of the second pores 105 in the second separator 101, and the first separator can be made thicker than the second separator.

Figure 16A:
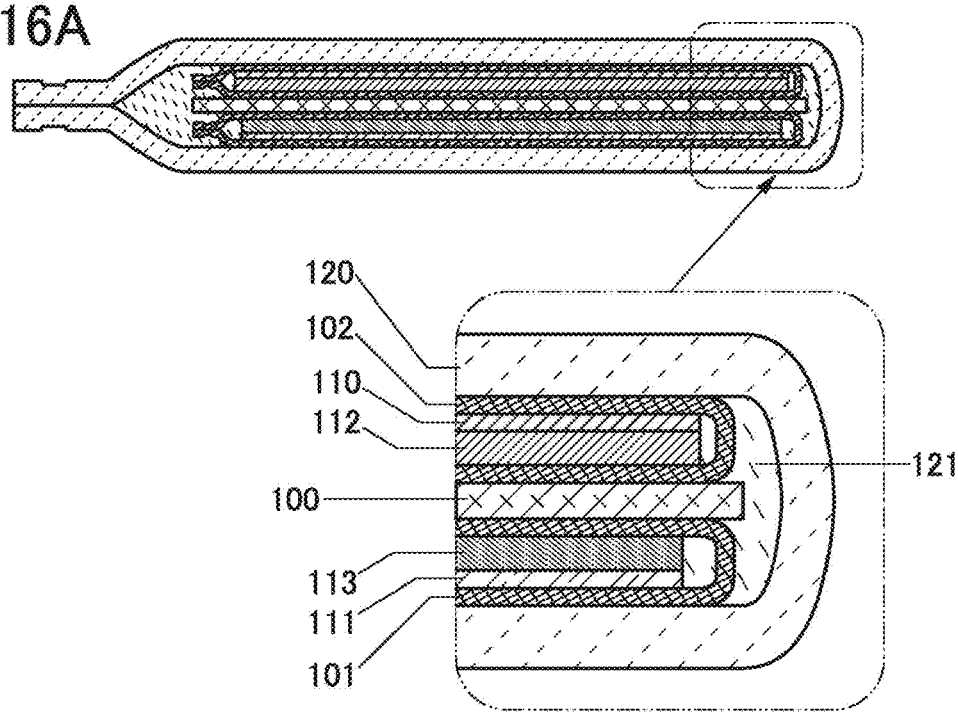
FIGS. 16A and 16B are cross-sectional schematic views showing one embodiment of the present invention.
Figure 16B:
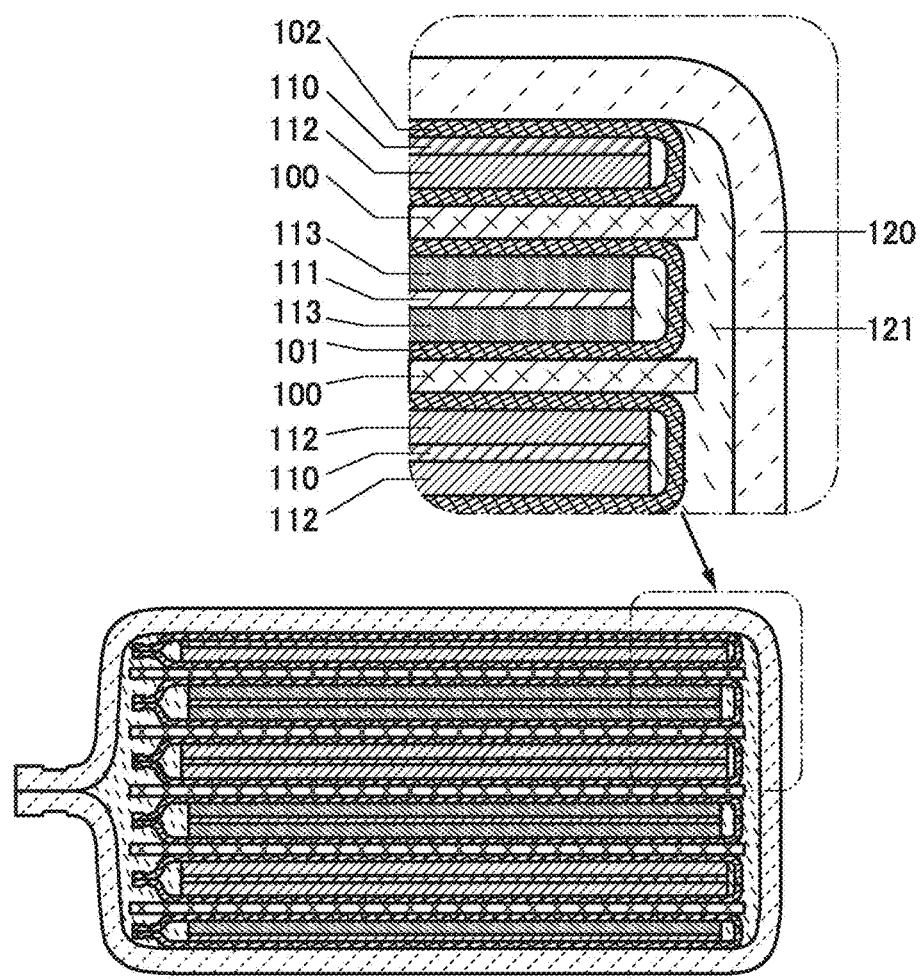
Figure 17A:
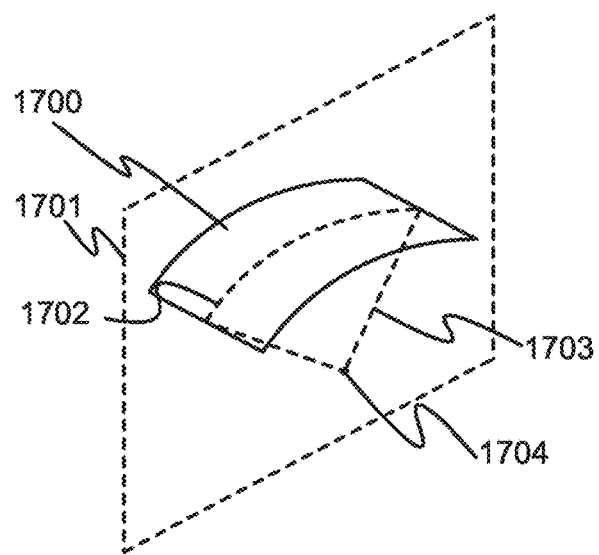
FIGS. 17A to 17C illustrate the rad us of curvature.
Figure 17B:
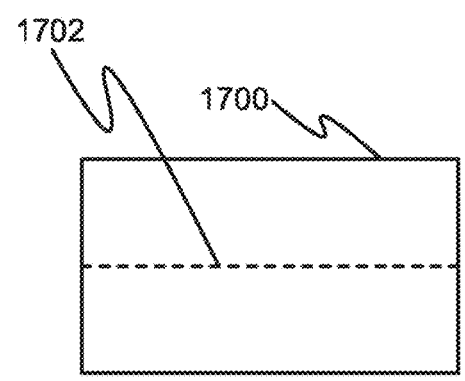
Figure 17C:
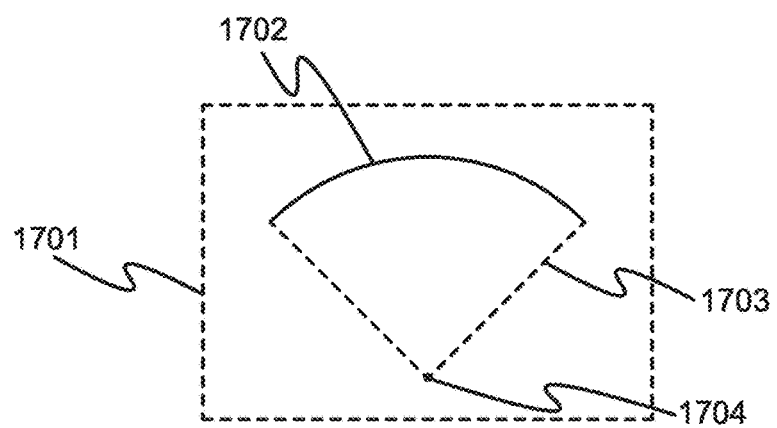
Figure 18A:
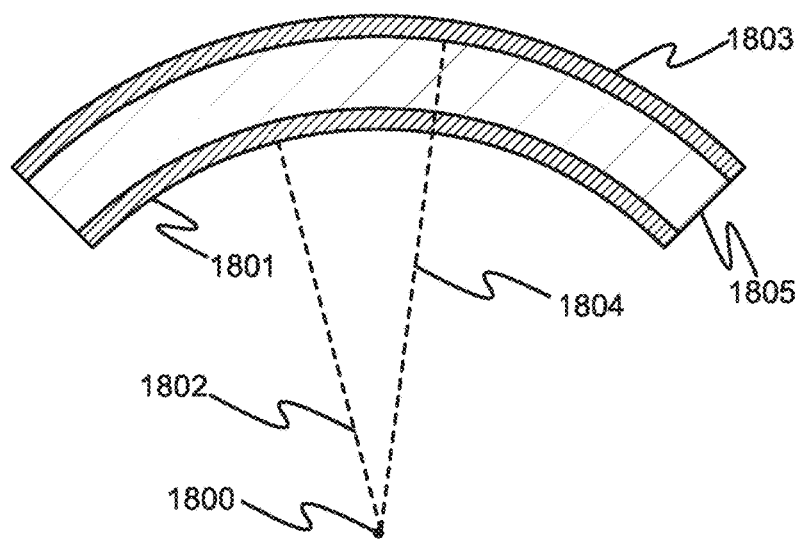
FIGS. 18A to 18D illustrate a secondary battery having flexibility.
Figure 18B:
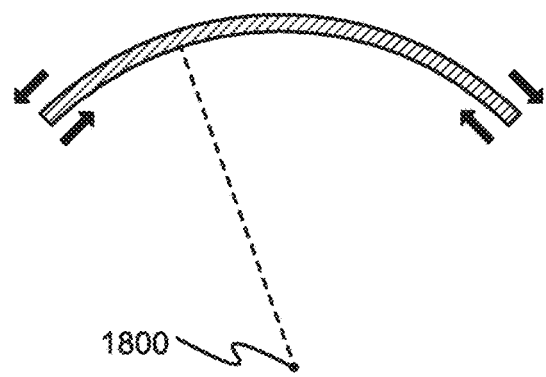
Figure 18C:
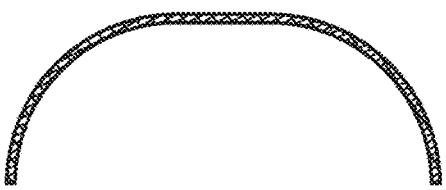
Figure 18D:

Insulation performance that prevents the positive electrode and the negative electrode from being connected to each other can be obtained mainly by the second separator 101 and the third separator 102, and high ionic conductivity can be obtained by the first separator 100 having a large thickness. In the case where the second separator 101 and the third separator 102 are each formed into a sheet-like shape large enough to cover both surfaces of the electrode or into an envelope-like shape to envelop the electrode, the positive electrode and the negative electrode can be protected from mechanical damage and the positive electrode and the negative electrode can be easily handled in manufacturing the secondary battery. The first separator 100 is provided between the positive electrode enveloped by the second separator 101 and the negative electrode enveloped by the third separator 102, the resulting component is stored in the exterior body 120, and the exterior body 10 is filled with the electrolyte solution 121. In this manner, the secondary battery can be manufactured FIGS. 16A and 16B show cross-sectional structures of secondary batteries each including the second separator 101 and the third separator 102 having an envelope-like shape. FIG. 16A shows a cross-sectional structure of the secondary battery including a pair of the positive electrode and the negative electrode. A secondary battery having a stacked-layer structure including a plurality of pairs of the positive electrode and the negative electrode can be manufactured. FIG. 16B shows a cross-sectional structure of the secondary battery having a stacked-layer structure. In the secondary battery having a stacked-layer structure, the electrode active material is formed on both surfaces of the current collector, and the resulting component is enveloped by an envelope-like separator.

Embodiment 1 can be referred to for materials of the positive electrode, the positive electrode active material, the negative electrode, the negative electrode active material, and the electrolyte solution, and a method for forming each electrode When the separator between the positive electrode and the negative electrode bus a three-layer structure, stress generated by change in the shape of the flexible secondary battery can be relieved. That is two films can be shifted from each other at the interface between the first separator 100 and the second separator 101 and the interface between the first separator 100 and the third separator 102, which relieves stress due to the change in shape. Thus, shear failure caused by the change in shape can be prevented in the secondary battery.

Note that a part or all of the materials, the thicknesses, and other characteristics of the second separator 101 and the third separator 102 can be replaced with a part or all of the material, the thickness, and other characteristics of the first separator 100. Furthermore, the material, the thickness, the size of the pore, the proportion of the volume of the pores in the film, and other characteristics of the second separator 101 can be partly or wholly different from the material, the thickness, the size of the pore, the proportion of the volume of the pores in the flint, and other characteristics of the third separator 102. By using the three separators, the properties of the separator in the secondary battery can be set variously. Furthermore, the separator can have a structure of four or more layers.

Embodiment 3

In this embodiment, structures of a secondary battery including the separator described in Embodiment 1 or Embodiment 2 are described with reference to FIGS. 5A to 5C, FIG. 6, and FIGS. 7A and 7B.

(Coin-Type Secondary Battery)

Figure 5A:
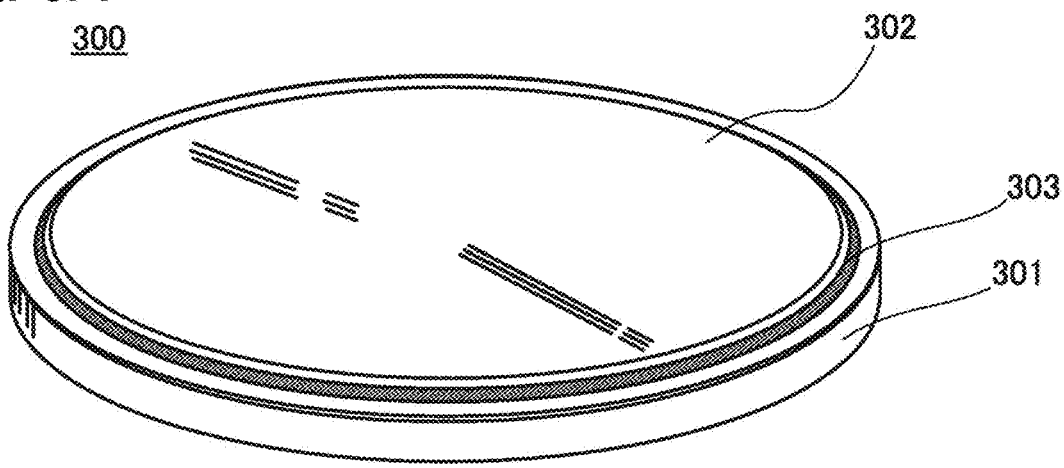
FIGS. 5A to 5C illustrate a coin-type secondary battery.
Figure 5B:
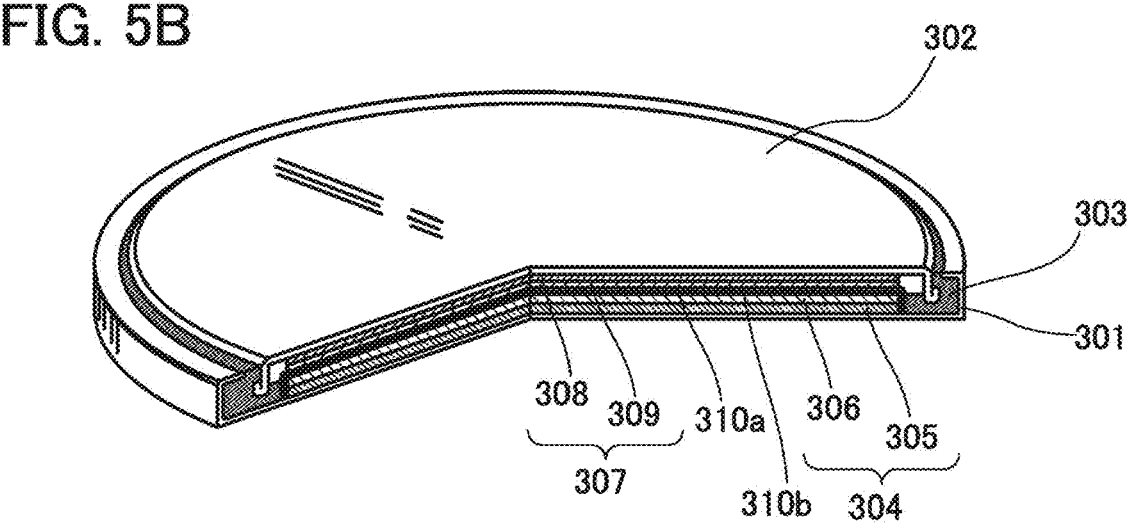

FIG. 5A is an external view of u coin-type (single-layer flat type) secondary battery. FIG. 5B is a cross-sectional view of the coin-type secondary battery.

In a coin-type secondary battery 300, a positive electrode can 301 doubling as a positive electrode terminal and a negative electrode can 302 doubling as a negative electrode terminal are insulated from each other and sealed by a gasket 303 made of, for example, polypropylene. A positive electrode 304 includes a positive electrode current collector 305 and a positive electrode active material layer 306 provided in contact with the positive electrode current collector 305. A negative electrode 307 includes a negative electrode current collector 308 and a negative electrode active material layer 309 provided in contact with the negative electrode current collector 308. A separator 310a, a separator 310b, and an electrolyte (not illustrated) are included between the positive electrode active material layer 306 and the negative electrode active material layer 309.

For the positive electrode can 301 and the negative electrode can 302, a metal having corrosion resistance to an electrolyte solution, such as nickel, aluminum, or titanium, an alloy of such a metal, and an alloy of such a metal and another metal (e.g., stainless steel) can be used. Alternatively, the positive electrode can 301 and the negative electrode can 302 are preferably coated with, for example, nickel or aluminum in order to prevent corrosion caused by the electrolyte solution. The positive electrode can 301 and the negative electrode can 302 are electrically connected to the positive electrode 304 and the negative electrode 307, respectively.

The negative electrode 307, the positive electrode 304, the separator 310a, and the separator 310b are immersed in the electrolyte solution. Then, as illustrated in FIG. 5B, the positive electrode can 301, the positive electrode 304, the separator 310a, the separator 310b. the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type secondary battery 300 is fabricated.

Here, a current flow in charging a secondary battery is described with reference to FIG. 5C. When a secondary battery using lithium is regarded as a closed circuit, lithium ions move and a current flows in the same direction. Note that in the secondary battery using lithium, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" and the negative electrode is referred to as a "negative electrode" in all the eases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "amide" and "cathode" are not used in this specification. If the term "anode" or "cathode" is used, whether it is at the time of charging or discharging is noted and whether it corresponds to a positive electrode or a negative electrode is also noted.

Figure 5C:
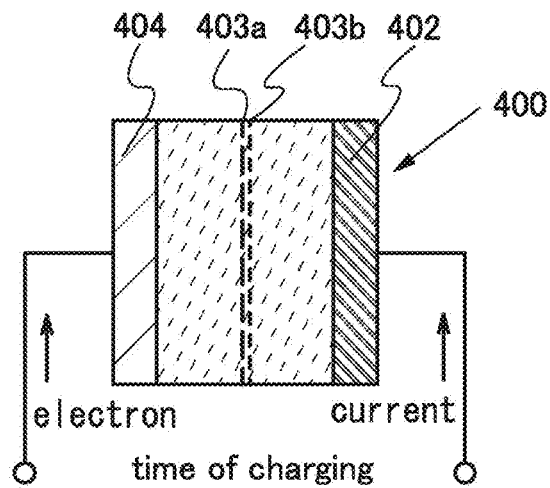

Two terminals in FIG. 5C are connected to a charger, and a secondary battery 400 is charged. As the charge of the secondary battery 400 proceeds, a potential difference between electrodes increases. The positive direction in FIG. 5C is the direction in which a current flows from the one terminal outside the secondary battery 400 to a positive electrode 402, flows from the positive electrode 402 to a negative electrode 404 through a separator 403a and a separator 403b in the secondary buttery 400, and flows from the negative electrode 404 to the other terminal outside the secondary battery 400. In other words, a current flows in the direction of a flow of a charging current.

(Secondary Battery with Stacked-Layer Structure)

Next, an example of a secondary battery with a stacked-layer structure will be described with reference to FIG. 6.

Figure 6:
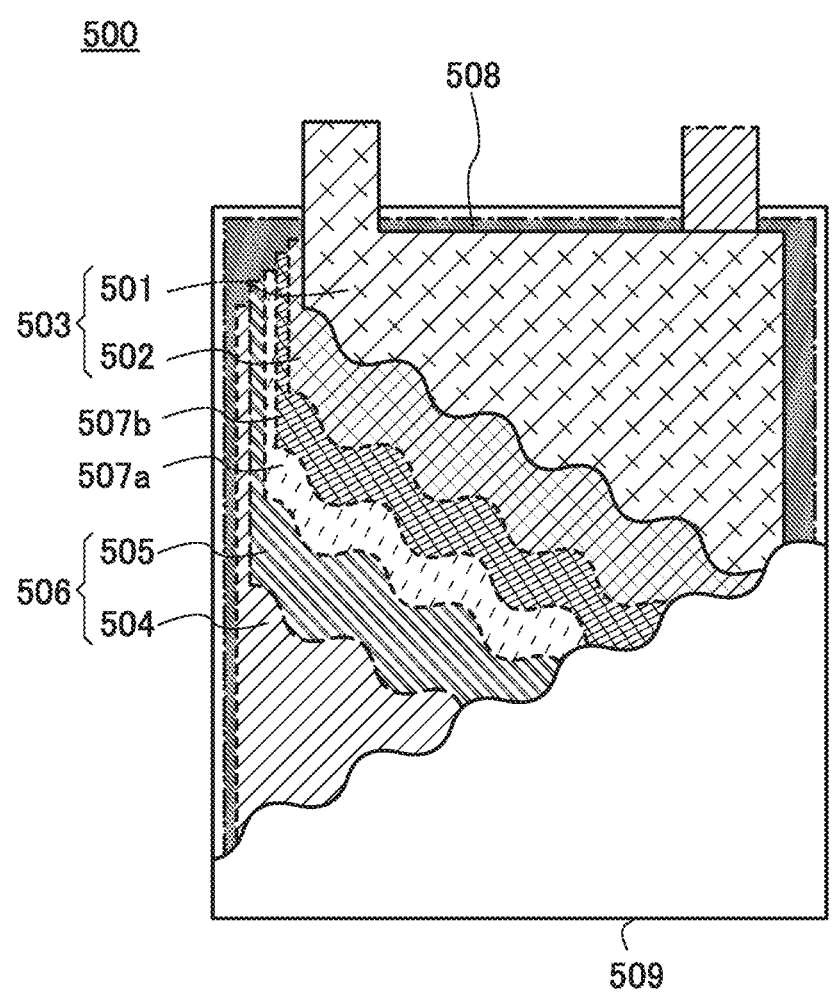
FIG. 6 illustrates a secondary battery having a stacked-layer structure.

A secondary battery 500 with a stacked-layer structure illustrated in FIG. 6 includes a positive electrode 503 including a positive electrode current collector 501 and a positive electrode active material layer 502, a negative electrode 506 including a negative electrode current collector 504 and a negative electrode active material layer 505, a separator 507a, a separator 507b, an electrolyte solution 508, and an exterior body 509. The separator 507a and the separator 507b are provided between the positive electrode 503 and the negative electrode 506 in the exterior body 509. The exterior body 509 is filled with the electrolyte solution 508. Note that separators may have a three-layer structure.

In the secondary battery 500 having a stacked-layer structure illustrated in FIG. 6, the positive electrode current collector 501 and the negative electrode current collector 504 also function as terminals for electrical contact with an external portion. For this reason, each of the positive electrode current collector 501 and the negative electrode current collector 504 is arranged so that part of the positive electrode current collector 501 and part of the negative electrode current collector 504 are exposed outside the exterior body 500.

As the exterior body 500 in the secondary battery 500 having a stacked-layer structure, a stacked film having a three-layer structure can be used, for example. In the three-layer structure, a highly flexible metal thin film of, for example, aluminum, stainless steel, copper, and nickel is provided over a film formed of a material such as polyethylene, polypropylene, polycarbonate, ionomer, and polyamide, and an insulating synthetic resin film of, for example, a polyamide-based resin and a polyester-based resin is provided as the outer surface of the exterior body over the metal thin film. With such a three-layer structure, permeation of an electrolyte solution and a gas can be blocked and an insulating property and resistance to the electrolyte solution can be provided.

(Cylindrical Secondary Battery)

Figure 7A:
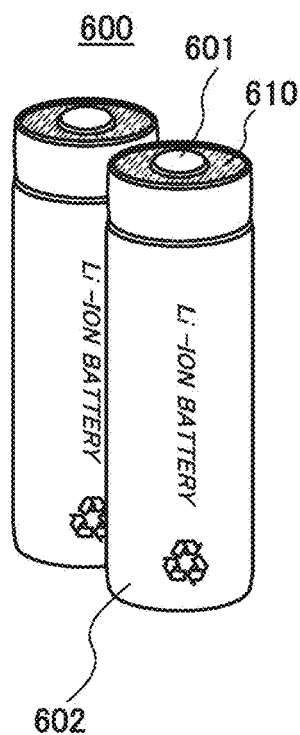
FIGS. 7A and 7B illustrate a cylindrical secondary battery.

Next, an example of a cylindrical secondary battery is described with reference to FIGS. 7A and 7B. As illustrated in FIG. 7A, a cylindrical secondary battery 600 includes a positive electrode cap (battery cap) 601 on its top surface and a battery can (outer can) 602 on its side surface and bottom surface The positive electrode cap 601 and the battery can 602 are insulated from each other with a gasket (insulating packing) 610.

Figure 7B:
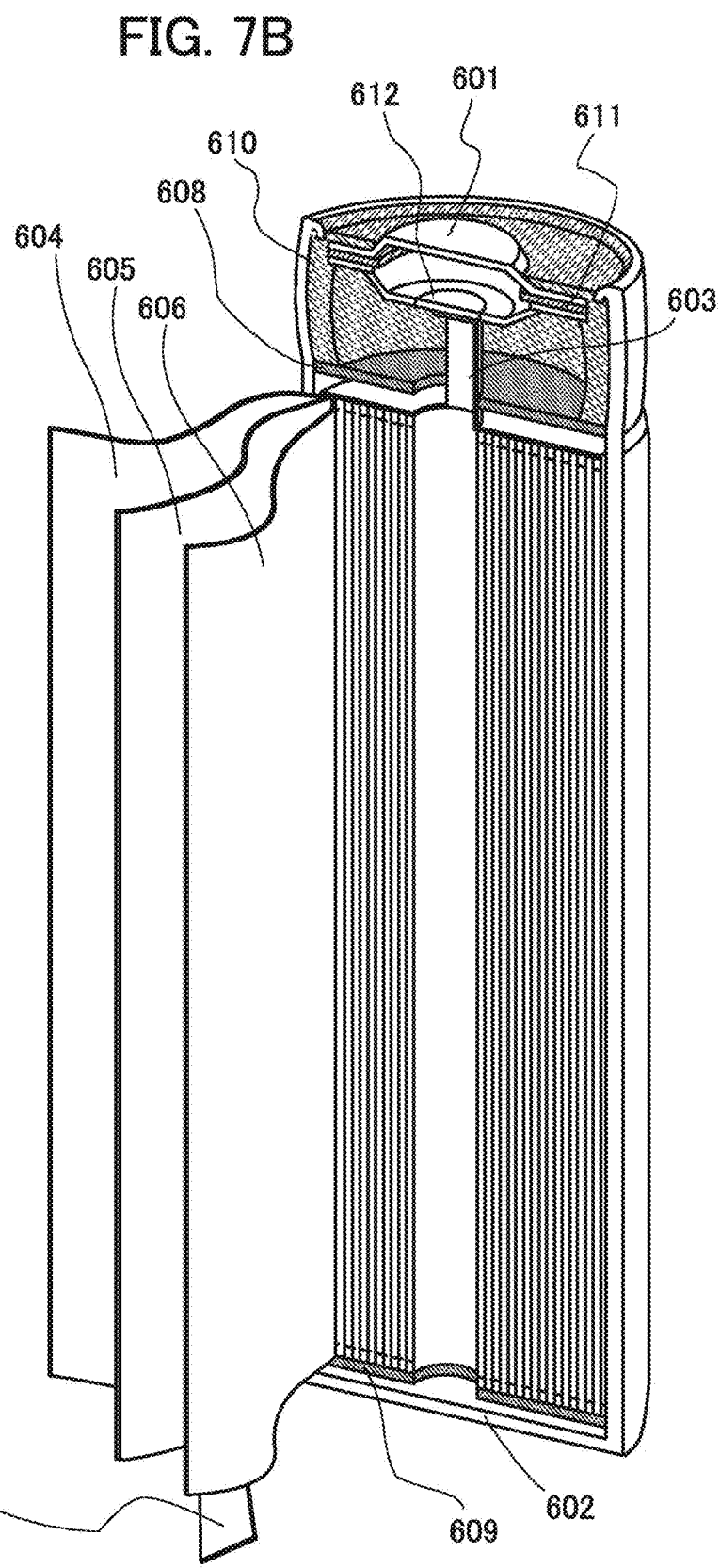

FIG. 7B is a schematic cross-sectional view of the cylindrical secondary battery, inside the battery can 602 having a hollow cylindrical shape, a battery element in which a strip-like positive electrode 604 and a strip-like negative electrode 606 are wound with a separator 605 positioned therebetween is provided. Note that the separator 605 has a two-layer structure or a three-layer structure. Although not illustrated, the battery element is wound around a center pin. One end of the battery can 602 is close and the other end thereof is open. For the battery can 602, a metal having corrosion resistance to an electrolyte solution, such as nickel, aluminum, or titanium, an alloy of such a metal, or an alloy of such a metal and another metal (e.g., stainless steel) can be used. Alternatively, the battery can 602 is preferably covered with nickel, aluminum, or the like in order to prevent corrosion caused by the electrolyte solution. Inside the battery can 602, the battery element in which the positive electrode, the negative electrode, and the separator are wound is positioned between a pair of insulating plates 608 and 609 which face each other. Further, an electrolyte solution (not illustrated) is injected inside the battery can 602 provided with the battery element. As the electrolyte solution, an electrolyte solution that is similar to those of the above coin-typo secondary battery and the secondary battery having a stacked-layer structure can be used.

The strip-like positive electrode 604 and the strip-like negative electrode 606 can be formed in a manner similar to that of the positive electrode and the negative electrode of the coin-type secondary battery described above; however, the difference lies in that, electrode active materials are termed on both sides of a current collector in each electrode because the positive electrode and the negative electrode of the cylindrical secondary battery are wound. A positive electrode terminal (positive electrode current collecting lead) 603 is connected to the strip-like positive electrode 604, and a negative electrode terminal (negative electrode current collecting lead) 607 is connected to the strip-like negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the strip-like positive electrode 604 when the internal pressure of the battery exceeds a predetermined threshold value. The PTC element 611 is a heat sensitive resistor whose resistance increases as temperature rises, and controls the amount of current by increase in resistance to prevent abnormal heat generation. Note that barium titanate ($BaTiO_3$)-based semiconductor ceramic or the like can be used for the PTC element.

Note that in this embodiment, the coin-type secondary battery, the secondary battery having a stacked-layer structure, and the cylindrical secondary battery are given as examples of the secondary battery; however, any of secondary batteries with a variety of shapes, such as a sealed secondary battery and a rectangular secondary battery, can be used. Further, a structure in which a plurality of positive electrodes, a plurality of negative electrodes, and a plurality of separators are stacked or rolled may be employed.

The coin-type secondary battery 300, the secondary battery 500, and the cylindrical secondary battery 600 described in this embodiment each have the separator including a plurality of layers having different characteristics. Therefore, the characteristics of the separator of the secondary battery can be determined variously.

Note that this embodiment can be implemented by being combined with any of other embodiments as appropriate.

Embodiment 4

In this embodiment, examples of a structure of a power storage device are described with reference to FIGS. 8A and 8B, FIGS. 9A1, 9A2, 9B1 and 9B2, FIGS. 10A and 10B, FIGS. 11A and 11B, and FIG. 12.

Figure 8A:
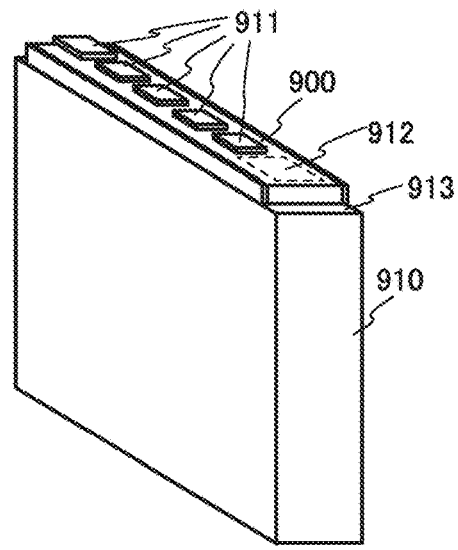
FIGS. 8A and 8B illustrate an example of a power storage device.
Figure 8B:
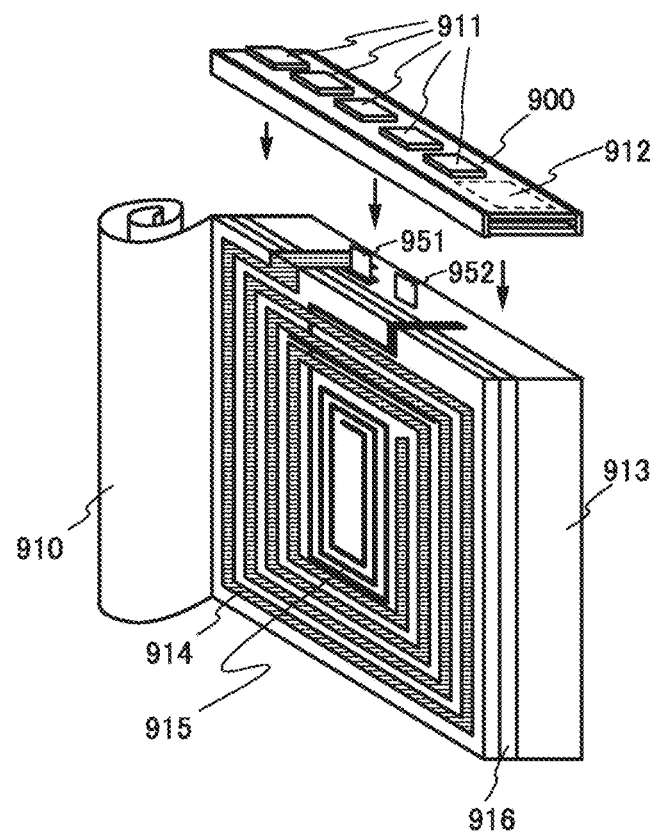

FIGS. 8A and 8B show external views of a power storage device. The power storage device includes a circuit board 900 and a power storage unit 913. A label 910 is attached to the power storage unit 913. As illustrated in FIG. 8B, the power storage system further includes a terminal 951, a terminal 952, and an antenna 914 and an antenna 915 which are provided behind the label 910.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface of the circuit board 900. Note that the shape of the antennas 914 and 915 is not limited to a coil shape and may be a linear shape or a plate shape, for example. Furthermore, a planar antenna, an aperture antenna, a traveling-wave antenna, an fill antenna, a magnetic-field antenna, a dielectric antenna, or the like may be used. Alternatively, the antenna 914 or the antenna 915 may be a flat-plate conductor. The flat-plate conductor can serve as one of conductors for electric field coupling that is the antenna 914 or the antenna 915 may serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage device includes a layer 916 between the power storage unit 913 and the antennas 914 and 915. The layer 916 has a function of blocking an electromagnetic field from the power storage unit 913, for example. As the layer 916. for example, a magnetic body can be used.

Note that the structure of the power storage device is not limited to that in FIGS. 8A and 8B.

For example, as illustrated in FIGS. 9A1 and 9A2, two opposite sides of the power storage unit 913 in FIGS. 8A and 8B may be provided with the respective antennas. FIG. 9A1 is an external view showing one of the opposite sides, and FIG. 9A2 is an external view showing the other of the opposite sides. Note that for the same portions as the power storage device in FIGS. 8A and 8B, description on the power storage device in FIGS. 8A and 8B can be referred to as appropriate.

As illustrated in FIG. 9A1, the antenna 914 is provided on one of the opposite sides of the power storage unit 913 with the layer 916 provided therebetween, and as illustrated in FIG. 9A2, the antenna 915 is provided on the other of the opposite sides of the power storage unit 913 with a layer 917 provided therebetween. The layer 917 has a function of blocking an electromagnetic field from the power storage unit 913, for example. As the layer 917, for example, a magnetic body can be used.

With the above structure, both the antenna 914 and the antenna 915 can be increased in size.

Alternatively, as illustrated in FIGS. 9B1 and 9B2, two opposite sides of the power storage unit 913 in FIGS. 8A and 8B may be provided with different types of antennas FIG. 9B1 is an external view slowing one of the opposite sides, and FIG. 9B2 is an external view showing the other of the opposite sides. Note that for the same portions as the power storage device in FIGS. 8A and 8B, description on the power storage device in FIGS. 8A and 8B can be referred to as appropriate.

As illustrated in FIG. 9B1, the antennas 914 and 915 are provided on one of the opposite sides of the power storage unit 913 with the layer 916 provided therebetween, and as illustrated in FIG. 9A2, an antenna 918 is provided on the other of the opposite sides of the power storage unit 913 with the layer 917 provided therebetween. The antenna 918 has a function of performing data communication with an external device, for example. An antenna with a shape that can be applied to the antennas 914 and 915 can be used as the antenna 918, for example. As an example of a method for communication between the power storage device and an external device via the antenna 918, a response method such as NFC can be given.

Figure 10A:
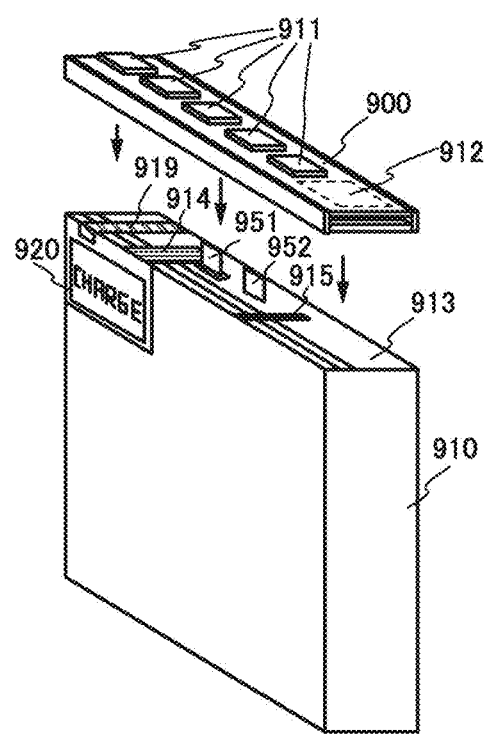
FIGS. 10A and 10B illustrate examples of a power storage device.

Alternatively, as illustrated in FIG 10A, the power storage unit 913 in FIGS. 8A and 8B may be provided with a display device 920. The display device 920 is electrically connected to the terminal 911 via a terminal 919. It is not necessary to provide the label 910 in a portion where the display device 920 is provided. Note that for the Name portions as the power storage system in FIGS. 8A and 8B, description on the power storage device in FIGS. 8A and 83 can be referred to us appropriate.

The display dev ice 920 can display, for example, an image showing whether charging is being carried out or an image showing the amount of stored power. As the display device 920, electronic paper, a liquid crystal display device, an electroluminescent (EL) display device, or the like can be used. For example, the power consumption of the display device 920 can be reduced when electronic paper is used.

Figure 10B:
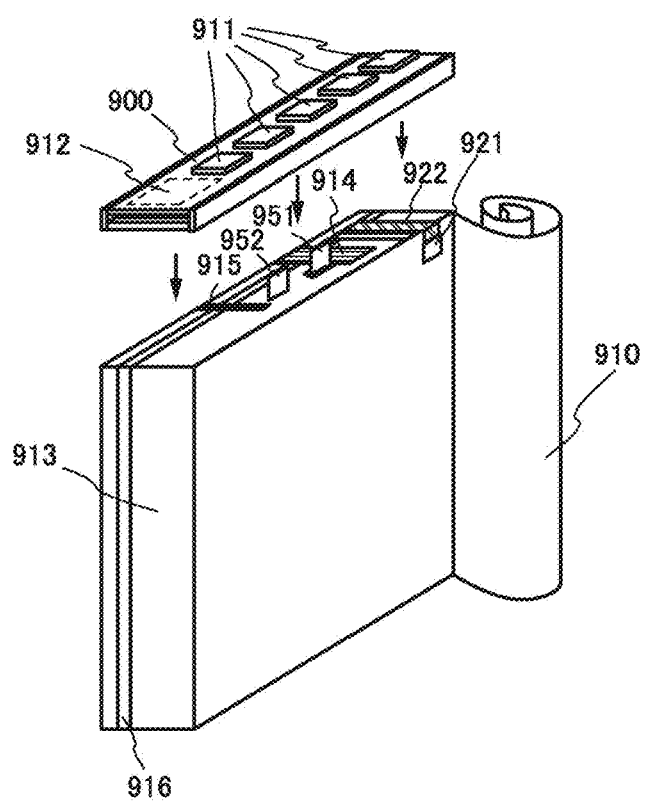

Alternatively, as illustrated in FIG. 10B, the power storage unit 913 in FIGS. 8A and 88 may be provided with a sensor 921. The sensor 921 is electrically connected to the terminal 911 via a terminal 922. Note that the sensor 921 may be provided behind the label 910. Note that for the same portions as the power storage device in FIGS. 8A and 8B, description on the power storage device in FIGS. 8A and 8B can be referred to as appropriate.

For the sensor 921, any of a variety of sensors can be used. With the sensor 921, for example, data on an environment (e.g., temperature) where the power storage device is placed can be determined and stored in a memory inside the circuit 912.

Furthermore, structural examples of the power storage unit 913 are described with reference to FIGS. 11A and 11B and FIG. 12.

Figure 11A:
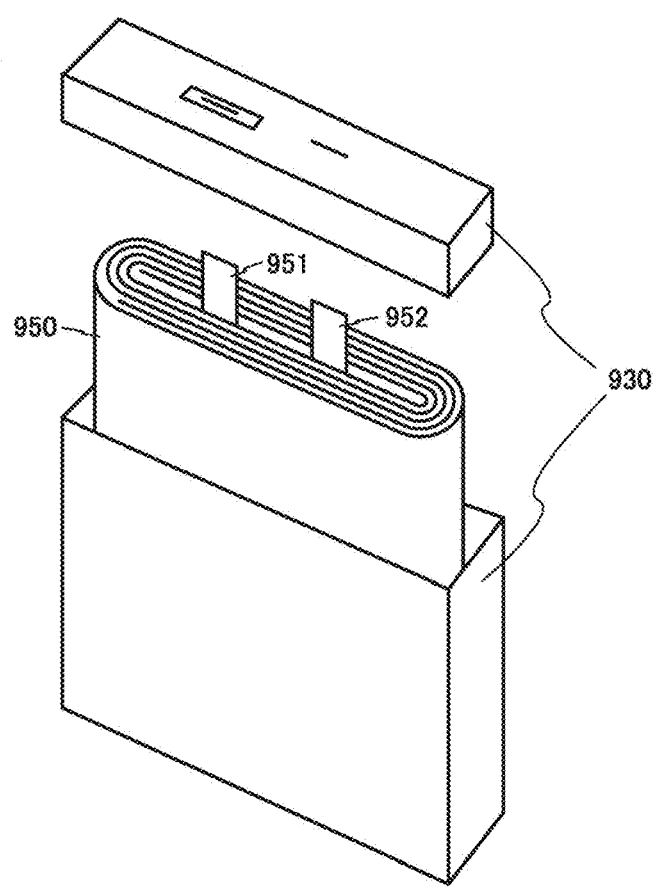
FIGS. 11A and 11B illustrate examples of a power storage device.
Figure 11B:
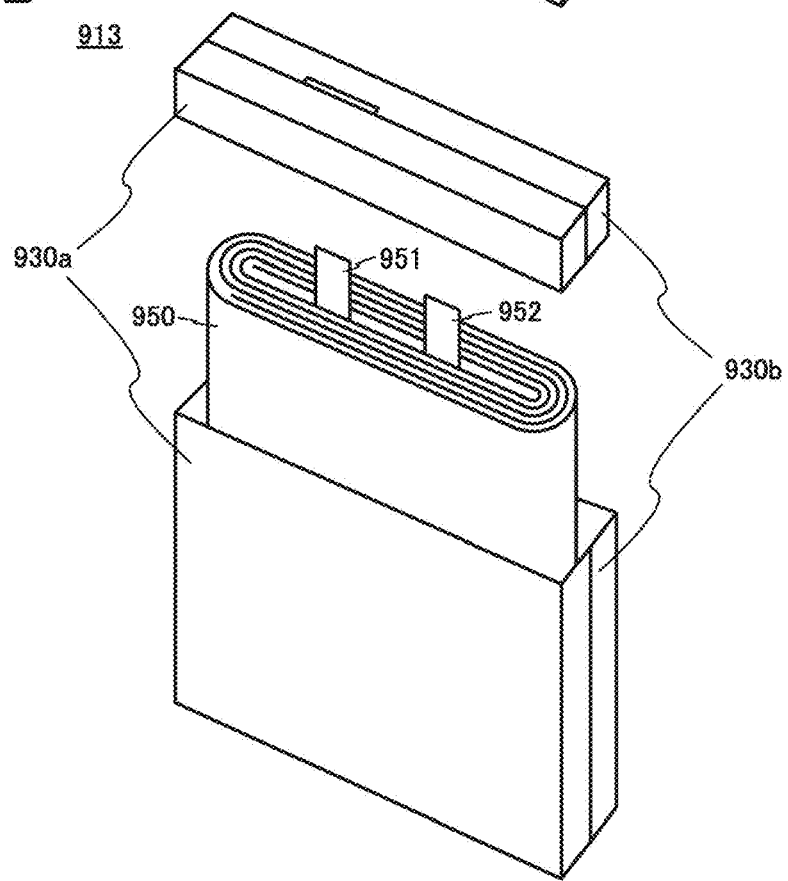

In the power storage unit 913 illustrated in FIG. 11A, a wound body 950 having the terminals 951 and 952 is provided in a housing 930. The wound body 950 is soaked in an electrolyte solution inside the housing 930. The terminal 952 is in contact with the housing 930. An insulator or the like prevents contact between the terminal 951 and the housing 930. Note that FIG. 11A illustrates the housing 930 divided into two pieces for convenience; however, in the actual structure, the wound body 950 is covered with the housing 930 and the terminals 951 and 952 extend to the outside of the housing 930. For the housing 930, a metal material (e.g., aluminum) or a resin material can be used.

Note that the housing 930 illustrated in FIG. HA may be formed using a plurality of materials. For example, in the power storage unit 913 in FIG. 11B, a housing 930a and a housing 930b are attached to each other and the wound body 950 is provided in a region surrounded by the housing 930a and the housing 930b.

For the housing 930a, an insulating material such as an organic resin can be used. In particular, when a material such as an organic resin is used for the side on which an antenna is formed, an electric field can be prevented from being blocked by the power storage unit 913. When an electric field is not significantly blocked by the housing 930a, an antenna such as the antenna 914 or the antenna 915 may be provided inside the housing 930. For the housing 930b, a metal material can be used, for example.

Figure 12:
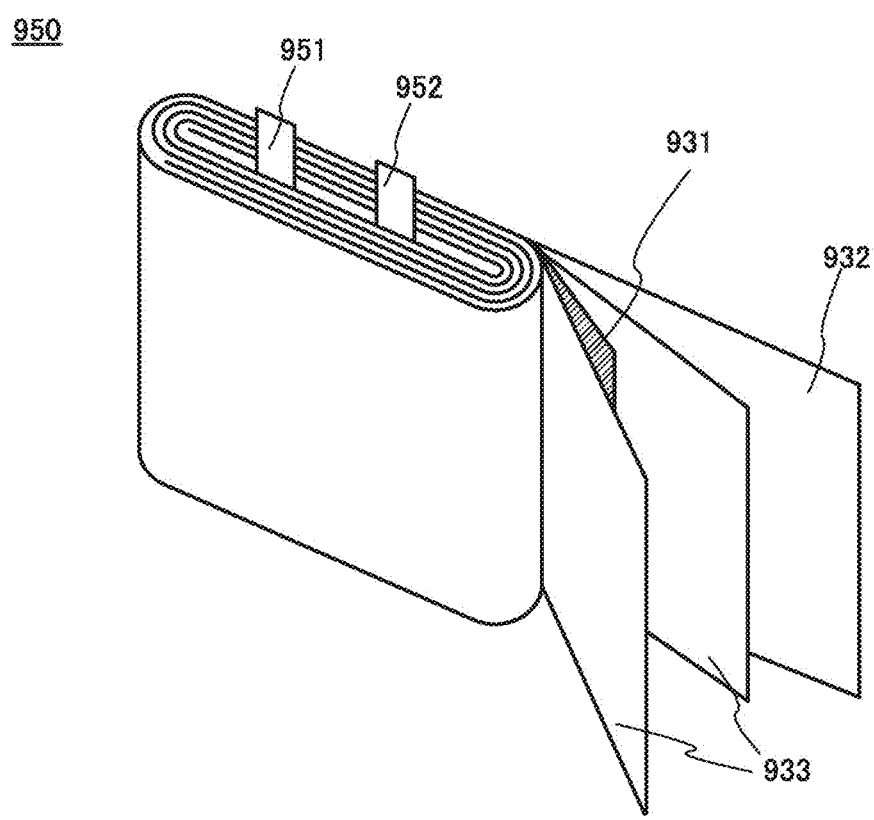
FIG. 12 illustrates an example of a power storage device.

FIG. 12 shows a structure of the wound body 950. The wound body 950 includes a negative electrode 931, a positive electrode 932, and a separator 933. Note that the separator 933 has a two-layer structure or a three-layer structure. The wound body 950 is obtained by winding a sheet of a stack in which the negative electrode 931 overlaps with the positive electrode 932 with the separator 933 provided therebetween. Note that a plurality of sheets each including the negative electrode 931, the positive electrode 932, and the separator 933 may be stacked.

The negative electrode 931 is connected to the terminal 911 in FIGS. 8A and SB via one of the terminals 951 and 952. The positive electrode 932 is connected to the terminal 911 in FIGS. 8A and 8B via the other of the terminals 951 and 952.

This embodiment can be implemented in combination with any of the other embodiments as appropriate.

Embodiment 5

In this embodiment, examples of electronic devices including any of the secondary batteries illustrated in the above embodiments are described with reference to FIGS. 13A to 13F and FIGS. 14A to 14C.

Examples of electronic devices including secondary batteries are cameras such as digital cameras and digital video cameras, digital photo frames, mobile phones (also referred to as cellular phones or portable telephone devices), portable game consoles, portable information terminals, and audio reproducing devices. FIGS. 13A to 13F und FIGS. 14A to 14C illustrate specific examples of these electronic devices.

Figure 13A:
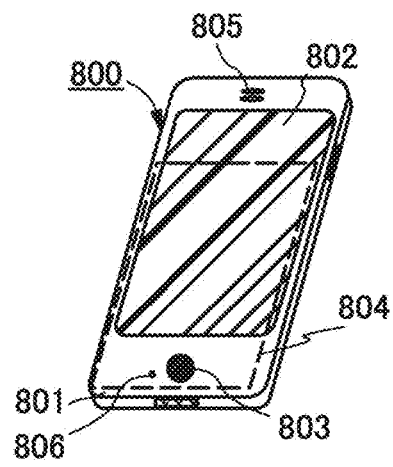
FIGS. 13A to 13F illustrate electronic devices.
Figure 14A:
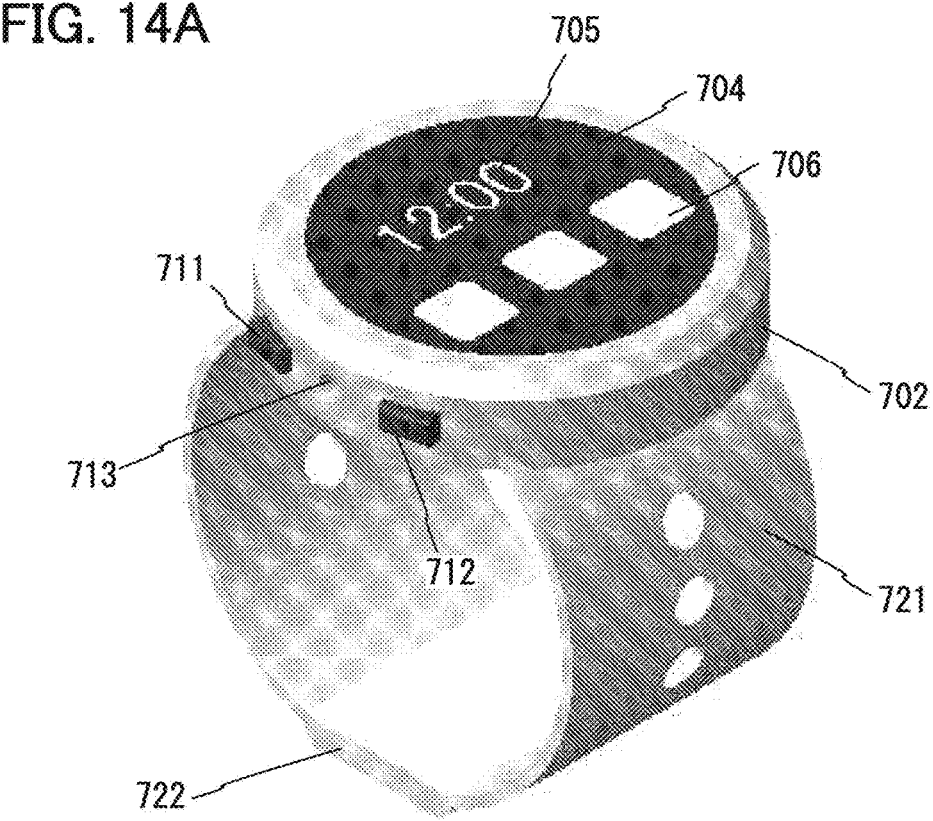
FIGS. 14A to 14C illustrate an electronic device.
Figure 14B:
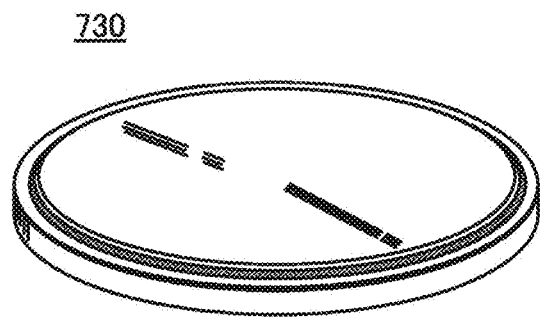
Figure 14C:
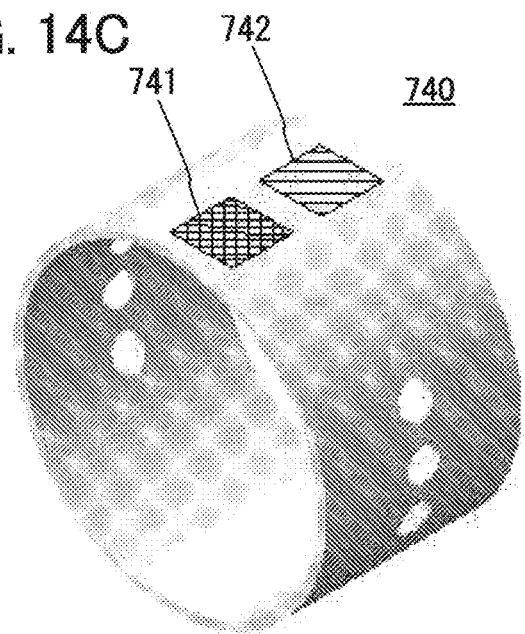

FIG. 13A illustrates an example of a mobile phone. A mobile phone 800 is provided with a display portion 802 incorporated in a housing 801, an operation button 803, a speaker 805, a microphone 806, and the like. The use of a secondary battery 804 of one embodiment of the present invention in the mobile phone 800 results in weight reduction.

When the display portion 802 of the mobile phone 800 illustrated in FIG. 13A is touched with a finger or the like, data can be input into the mobile phone 800. Users can make a call or text messaging by touching the display portion 802 with their fingers or the like.

There are mainly three screen modes for the display portion 802. The first mode is a display mode mainly for displaying an image. The second mode is an input mode mainly for inputting data such as characters. The third mode is a display-and-input mode in which two modes of the display mode and the input mode are combined.

For example, in the case of making a call or composing an e-mail, a text input mode mainly for inputting text is selected for the display portion 802 so that text displayed on a screen can be inputted.

When a sensing device including a sensor such as a gyroscope and an acceleration sensor for detecting inclination is provided in the mobile phone 800. display on the screen of the display portion 802 can be automatically changed in direction by determining the orientation of the mobile phone 800 (whether the mobile phone 800 is placed horizontally or vertically for a landscape mode or a portrait mode).

The screen modes are switched by touching the display portion 802 or Operating the operation button 803 of the housing 801. Alternatively, the screen modes may be switched depending on the kind of the image displayed on the display portion 802. For example, when a signal of an image displayed on the display portion is a signal of moving image data, the screen mode is switched to the display mode. When the signal is a signal of text data, the screen mode is switched to the input mode.

Moreover, in the input mode, if a signal detected by an optical sensor in the display portion 802 is detected and the input by touch on the display portion 802 is not performed for a certain period, the screen node may be controlled so as to be changed from the input mode to the display mode.

The display portion 802 can function as an image sensor. For example, an image of a palm print, a fingerprint, or the like is taken with the display portion 802 touched with the palm or the finger, whereby personal authentication can be performed. Furthermore, by providing a backlight or a sensing light source that emits near-infrared light in the display portion, an image of a finger vein, a palm vein, and the like can be taken.

Figure 13B:
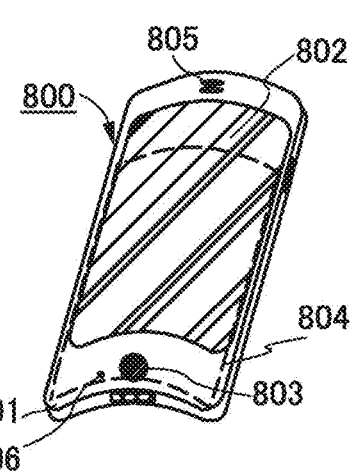
Figure 13C:
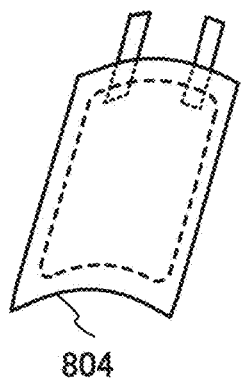

FIG. 13B illustrates the mobile phone 800 that is bent. When the whole mobile phone 800 is bent by the external force, the secondary battery 804 included in the mobile phone 800 is also bent. FIG. 13C illustrates the bent secondary battery 804. The secondary battery 804 is a secondary battery having a stacked-layer structure.

FIG. 14A illustrates a smart watch. The smart watch can include a housing 702, a display panel 704, operation buttons 711 and 712, a connection terminal 713, a band 721, a clasp 722, and the like. The use of the secondary battery of one embodiment of the present invention in the smart watch results in weight reduction. The coin-type secondary battery of one embodiment of the present invention which is described in Embodiment 3 may be included in the housing 702 (FIG. 14B). A flexible secondary battery 740 of one embodiment of the present invention may be included in the band 721 of the secondary battery. The flexible secondary battery 740 can have a band shape, in which case the flexible secondary battery 740 can be attachable to and detachable from the housing 702. Electric power can be supplied to the housing 702 through a positive electrode terminal 741 and a negative electrode terminal 742 (FIG. 14C).

The display panel 704 mounted in the housing 702 serving as a bezel includes a non-rectangular display region. The display panel 704 can display an icon 705 indicating time and another icon 706.

The smart watch illustrated in FIGS. 14A to 14C can have a variety of functions, for example, a function of displaying a variety of data (e.g., a still image, a moving image, and a text image) on a display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading program or data stored in a recording medium and displaying the program or data on a display portion.

The housing 702 can include a speaker, a sensor (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone, and so on.

Figure 13D:
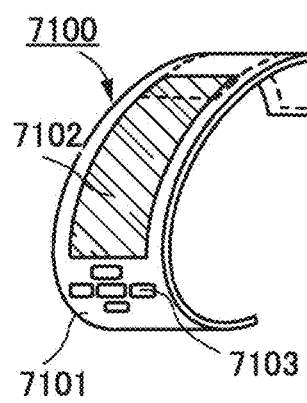
Figure 13E:

FIG. 13D illustrates an example of a bangle display device. A portable display device 7100 includes a housing 7101, a display portion 7102, an operation button 7103, and a secondary battery 7104. FIG. 13E illustrates the bent secondary battery 7104.

Figure 13F:
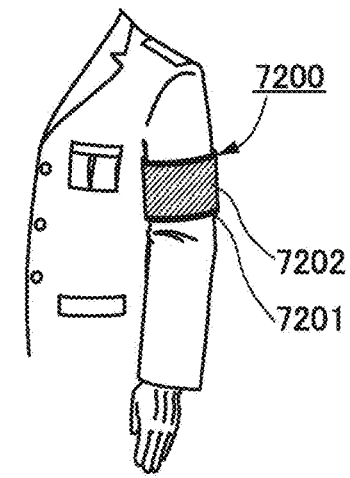

FIG. 13F illustrates an example of an armband display device. An armband display device 7200 includes a housing 7201 and a display portion 7202. Although not Shown, a flexible secondary battery is included in the armband display device 7200. The flexible secondary battery changes in shape in accordance with change in the shape of the armband display device 7200.

Note that the structure and the like described in this embodiment can be used as appropriate in combination with any of the structures and the like in the other embodiments. This application is based on Japanese Patent Application serial no. 2013-236697 filed with Japan Patent Office on Nov. 15, 2013, the entire contents of which are hereby incorporated by reference.

What is claimed is:

1. A nonaqueous secondary battery comprising:
   a positive electrode;
   a negative electrode; and
   a stacked-layer structure between the positive electrode and the negative electrode, the stacked-layer structure including a first separator and a second separator, wherein the first separator is over the positive electrode,
wherein the second separator is over and in contact with the first separator,
wherein the first separator includes a first pore,
wherein the second separator includes a second pore,
wherein a size of the second pore is smaller than a size of the first pore, and
wherein the first separator comprises a glass fiber.

2. The nonaqueous secondary battery according to claim 1, wherein a thickness of the second separator is smaller than a thickness of the first separator.

3. The nonaqueous secondary battery according to claim 1,
wherein the positive electrode comprises a positive electrode active material layer,
wherein the positive electrode active material layer comprises a positive electrode active material, and
wherein the positive electrode active material comprises a lithium-containing material having any one of an olivine crystal structure, a layered rock-salt crystal structure, and a spinel crystal structure.

4. The nonaqueous secondary battery according to claim 3, wherein the positive electrode active material layer further comprises a conductive additive including any one of acetylene black, graphite particles, carbon nanotubes, graphene, and fullerene.

5. The nonaqueous secondary battery according to claim 1,
wherein the negative electrode comprises a negative electrode active material layer,
wherein the negative electrode active material layer comprises a negative electrode active material, and
wherein the negative electrode active material comprises any one of graphite, graphitizing carbon, non-graphitizing carbon, a carbon nanotube, graphene, carbon black, and a material including at least one of Ga, Si, Al, Ge, Sn, Pb, Sb, Bi, Ag, Zn, Cd and In.

6. A nonaqueous secondary battery comprising:
a positive electrode;
a negative electrode; and
a stacked-layer structure between the positive electrode and the negative electrode, the stacked-layer structure including a first separator and a second separator,
wherein the first separator is over the positive electrode,
wherein the second separator is over and in contact with the first separator,
wherein the first separator includes first pores,
wherein the second separator includes second pores,
wherein a proportion of a volume of the second pores in the second separator is lower than a proportion of a volume of the first pores in the first separator, and
wherein the first separator comprises a glass fiber.

7. The nonaqueous secondary battery according to claim 6, wherein a thickness of the second separator is smaller than a thickness of the first separator.

8. The nonaqueous secondary battery according to claim 6,
wherein the positive electrode comprises a positive electrode active material layer,
wherein the positive electrode active material layer comprises a positive electrode active material, and
wherein the positive electrode active material comprises a lithium-containing material having any one of an olivine crystal structure, a layered rock-salt crystal structure, and a spinel crystal structure.

9. The nonaqueous secondary battery according to claim 8,
wherein the positive electrode active material layer further comprises a conductive additive including any one of acetylene black, graphite particles, carbon nanotubes, graphene, and fullerene.

10. The nonaqueous secondary battery according to claim 6,
wherein the negative electrode comprises a negative electrode active material layer,
wherein the negative electrode active material layer comprises a negative electrode active material, and
wherein the negative electrode active material comprises any one of graphite, graphitizing carbon, non-graphitizing carbon, a carbon nanotube, graphene, carbon black, and a material including at least one of Ga, Si, Al, Ge, Sn, Pb, Sb, Bi, Ag, Zn, Cd and In.

11. A nonaqueous secondary battery comprising:
a positive electrode;
a negative electrode; and
a stacked-layer structure between the positive electrode and the negative electrode, the stacked-layer structure including a first separator, a second separator, and a third separator,
wherein the first separator is over the positive electrode,
wherein the second separator is over the first separator,
wherein the third separator is over the second separator,
wherein the second separator is in contact with the first separator and the third separator,
wherein the first separator includes a first pore,
wherein the second separator includes a second pore,
wherein the third separator includes a third pore,
wherein a size of the second pore is different from a size of the first pore and a size of the third pore, and
wherein the second separator comprises a glass fiber.

12. The nonaqueous secondary battery according to claim 11,
wherein the first separator and the third separator each include a material, and
wherein the material is different from the grass fiber.

13. The nonaqueous secondary battery according to claim 11, wherein a thickness of the second separator is larger than a thickness of the first separator and a thickness of the third separator.

14. The nonaqueous secondary battery according to claim 11,
wherein the positive electrode comprises a positive electrode active material layer,
wherein the positive electrode active material layer comprises a positive electrode active material, and
wherein the positive electrode active material comprises a lithium-containing material having any one of an olivine crystal structure, a layered rock-salt crystal structure, and a spinel crystal structure.

15. The nonaqueous secondary battery according to claim 14, wherein the positive electrode active material layer further comprises a conductive additive including any one of acetylene black, graphite particles, carbon nanotubes, graphene, and fullerene.

16. The nonaqueous secondary battery according to claim 11,
wherein the negative electrode comprises a negative electrode active material layer,
wherein the negative electrode active material layer comprises a negative electrode active material, and
wherein the negative electrode active material comprises any one of graphite, graphitizing carbon, non-graphitizing carbon, a carbon nanotube, graphene, carbon black, and a material including at least one of Ga, Si, Al, Ge, Sn, Pb, Sb, Bi, Ag, Zn, Cd and In.

17. A nonaqueous secondary battery comprising:
a positive electrode;
a negative electrode; and
a stacked-layer structure between the positive electrode and the negative electrode, the stacked-layer structure including a first separator, a second separator, and a third separator,
wherein the first separator is over the positive electrode,
wherein the second separator is over the first separator,
wherein the third separator is over the second separator,
wherein the second separator is in contact with the first separator and the third separator,
wherein the first separator includes a first pore,
wherein the second separator includes a second pore,
wherein the third separator includes a third pore,
wherein a size of the second pore is larger than a size of the first pore and a size of the third pore, and
wherein the second separator comprises a glass fiber.

18. The nonaqueous secondary battery according to claim 17, wherein the first separator and the third separator each include a material, and wherein the material is different from the glass fiber.

19. The nonaqueous secondary battery according to claim 17, wherein a thickness of the second separator is larger than a thickness of the first separator and a thickness of the third separator.

20. The nonaqueous secondary battery according to claim 17,
wherein the positive electrode comprises a positive electrode active material layer,
wherein the positive electrode active material layer comprises a positive electrode active material, and
wherein the positive electrode active material comprises a lithium-containing material having any one of an olivine crystal structure, a layered rock-salt crystal structure, and a spinel crystal structure.

21. The nonaqueous secondary battery according to claim 20,
wherein the positive electrode active material layer further comprises a conductive additive including any one of acetylene black, graphite particles, carbon nanotubes, graphene, and fullerene.

22. The nonaqueous secondary battery according to claim 17,
wherein the negative electrode comprises a negative electrode active material layer,
wherein the negative electrode active material layer comprises a negative electrode active material, and
wherein the negative electrode active material comprises any one of graphite, graphitizing carbon, non-graphitizing carbon, a carbon nanotube, graphene, carbon black, and a material including at least one of Ga, Si, Al, Ge, Sn, Pb, Sb, Bi, Ag, Zn, Cd and In.

23. The nonaqueous secondary battery according to claim 1,
wherein the negative electrode is enveloped by the second separator.

24. The nonaqueous secondary battery according to claim 6,
wherein the negative electrode is enveloped by the second separator.

25. The nonaqueous secondary battery according to claim 11,
wherein the negative electrode is enveloped by the third separator.

26. The nonaqueous secondary battery according to claim 17,
wherein the negative electrode is enveloped by the third separator.

* * * * *